United States Patent
Yamamoto et al.

(10) Patent No.: US 10,134,189 B2
(45) Date of Patent: Nov. 20, 2018

(54) IMAGE DISPLAY DEVICE AND IMAGE DISPLAY METHOD

(71) Applicant: Sony Corporation, Tokyo (JP)

(72) Inventors: Yuki Yamamoto, Chiba (JP); Kenta Kawamoto, Tokyo (JP); Takayasu Kon, Tokyo (JP)

(73) Assignee: Sony Corporation (JP)

( * ) Notice: Subject to any disclaimer, the term of this patent is extended or adjusted under 35 U.S.C. 154(b) by 60 days.

(21) Appl. No.: 15/038,950

(22) PCT Filed: Nov. 11, 2014

(86) PCT No.: PCT/JP2014/079812
§ 371 (c)(1),
(2) Date: May 24, 2016

(87) PCT Pub. No.: WO2015/111283
PCT Pub. Date: Jul. 30, 2015

(65) Prior Publication Data
US 2016/0379413 A1    Dec. 29, 2016

(30) Foreign Application Priority Data
Jan. 23, 2014   (JP) ................................ 2014-010582

(51) Int. Cl.
*G06T 19/00*     (2011.01)
*G09G 5/00*     (2006.01)
(Continued)

(52) U.S. Cl.
CPC ............ *G06T 19/006* (2013.01); *G06F 3/011* (2013.01); *G06F 3/013* (2013.01); *G06F 3/017* (2013.01);
(Continued)

(58) Field of Classification Search
CPC .......... A63F 13/65; G09G 5/00; G09G 5/377; G09G 3/003; G09G 5/14; G09G 2354/00;
(Continued)

(56) References Cited

U.S. PATENT DOCUMENTS

2008/0088646 A1   4/2008   Sako et al.
2013/0127980 A1*   5/2013   Haddick ................. G06F 3/013
                                                                      348/14.08
(Continued)

FOREIGN PATENT DOCUMENTS

JP        2008096868 A     4/2008
JP        2008304268 A    12/2008
(Continued)

OTHER PUBLICATIONS

Grau et al. A Combined Studio Production System for 3-D Capturing of Live Action and Immersive Actor Feedback, IEEE Transactions on Circuits and Systems for Video Technology, vol. 14, No. 3, Mar. 2004, 370-380.*

(Continued)

*Primary Examiner* — Robert Craddock
(74) *Attorney, Agent, or Firm* — Lerner, David, Littenberg, Krumholz & Mentlik, LLP

(57) ABSTRACT

To provide an excellent image display device worn on a head or face and used to view images, and an image display method.
When displaying an image of a virtual world, such as a movie or computer graphics, with a display unit 309, a head-mounted display 100 temporarily removes the image in a portion specified with a touch panel, and display an image of the real world captured with an outward-facing camera 312. By looking at the image of the real world mixed in with the image of the virtual world, the user is able to perceive the real world and suitably interact with the real world, thereby (Continued)

making it possible to lessen psychological resistance while also avoiding physical harm due to events such as collisions with objects in the real world.

20 Claims, 18 Drawing Sheets

(51) Int. Cl.
| | |
|---|---|
| *G09G 5/36* | (2006.01) |
| *G09G 5/377* | (2006.01) |
| *G09G 3/00* | (2006.01) |
| *G09G 5/14* | (2006.01) |
| *G06F 3/01* | (2006.01) |
| *G06F 3/041* | (2006.01) |
| *G06T 19/20* | (2011.01) |
| *G06F 3/0488* | (2013.01) |
| *G02B 27/01* | (2006.01) |

(52) U.S. Cl.
CPC .......... *G06F 3/041* (2013.01); *G06F 3/04883* (2013.01); *G06T 19/20* (2013.01); *G09G 3/003* (2013.01); *G09G 5/00* (2013.01); *G09G 5/14* (2013.01); *G09G 5/36* (2013.01); *G09G 5/377* (2013.01); *G02B 2027/014* (2013.01); *G02B 2027/0132* (2013.01); *G02B 2027/0138* (2013.01); *G02B 2027/0178* (2013.01); *G02B 2027/0187* (2013.01); *G06T 2219/2004* (2013.01); *G09G 2354/00* (2013.01)

(58) Field of Classification Search
CPC .... G02B 2027/0178; G02B 2027/0132; G02B 2027/0138; G02B 2027/014; G02B 2027/0187; G06F 3/013; G06F 3/041; G06T 19/20; G06T 2219/2004
See application file for complete search history.

(56) References Cited

U.S. PATENT DOCUMENTS

| | | |
|---|---|---|
| 2013/0249787 A1 | 9/2013 | Morimoto |
| 2013/0335321 A1 | 12/2013 | Sugita et al. |

FOREIGN PATENT DOCUMENTS

| | | |
|---|---|---|
| JP | 2012-042654 A | 3/2012 |
| JP | 2012-141461 A | 7/2012 |
| JP | 2013200325 A | 10/2013 |
| JP | 2013258573 A | 12/2013 |

OTHER PUBLICATIONS

International Search Report from International Publication No. PCT/JP2014/079812 dated Jan. 27, 2015.

* cited by examiner

HEAD-MOUNTED DISPLAY 100

IMAGE DISPLAY DEVICE AND IMAGE DISPLAY METHOD

CROSS-REFERENCE TO RELATED APPLICATIONS

This application is a national phase entry under 35 U.S.C. § 371 of International Application No. PCT/JP2014/079812 filed Nov. 11, 2014, which claims the priority from Japanese Patent Application No. 2014-010582, filed in the Japanese Patent Office on Jan. 23, 2014.

TECHNICAL FIELD

The technology disclosed in this specification relates to an image display device worn on a user's head or face and used to view images, and to an image display method.

BACKGROUND ART

Image display devices that are worn on the head or the face and used to view images, or in other words, head-mounted displays, are known. With a head-mounted display, an image display unit is disposed for each of the left and right eyes, for example, and an enlarged virtual image of a display image is formed by a virtual image optical system, thereby enabling the user to view an immersive image. Head-mounted displays are extremely popular. If mass production advances further in the future, head-mounted displays may become as common as mobile phones, smartphones, or handheld game consoles, and everyone may come to own their own head-mounted display.

A head-mounted display is configured to cover the user's eyes directly when worn on the head. In other words, a head-mounted display is opaque, thus increasing the sense of immersion when viewing images. A virtual image optical system is used to enlarge and project a display screen, enabling the user to view an image as an enlarged virtual image with a suitable angle of view. In addition, if multi-channel audio is reproduced with headphones, it is possible to recreate the sense of being in a movie theater (for example, see Patent Literature 1). On the other hand, see-through head-mounted displays also exist, making it possible to look at the outside surroundings past the image (that is, see through the image) even while the user is wearing the device on his or her head and an image is being displayed (for example, see Patent Literature 2).

Regardless of whether the type is opaque or see-through, a head-mounted display restricts the vision and hearing of the wearing user. For this reason, there are concerns about the user being closed off from the real world and being slower to react to phenomena occurring in the outside world.

SUMMARY OF INVENTION

Technical Problem

An objective of the technology disclosed in this specification is to provide an excellent image display device worn on a user's head or face and used to view images, and an image display method.

Solution to Problem

The present application has been filed in view of the above-described problem, a technique recited in claim 1 is an image display device worn on a head or face, including: a display unit; a real world image acquisition unit configured to acquire an image of a real world; a region specification unit configured to specify a region in which to display the image of the real world; and an image generation unit configured to mix the image of the real world into a virtual image on a basis of the specified region, and generate an image to display on the display unit.

According to a technique recited in claim 2 of the present application, the display unit of the image display device according to claim 1 is disposed at an eye position of a user wearing the image display device on his or her head or face, and the image display device further includes an image capture unit that captures an image of a gaze direction of the user. The real world image acquisition unit is configured to acquire an image of the real world captured by the image capture unit.

According to a technique recited in claim 3 of the present application, the image display device according to claim 1 further includes: a virtual world image generation unit configured to generate an image of a virtual world; and a region image generation unit configured to calculate an image $R_I$ of the real world and an image $R_V$ of the virtual world corresponding to the region specified by the region specification unit. The image generation unit is configured to generate the image to display on the display unit by replacing the image $R_V$ of a corresponding region of a virtual world rendering result V with the image $R_I$ of the corresponding region of the real world.

According to a technique recited in claim 4 of the present application, the region specification unit of the image display device according to claim 3 is configured to specify the region in which to display the image of the real world based on an operation by the user.

According to a technique recited in claim 5 of the present application, the image generation unit of the image display device according to claim 4 is configured to control a mixture ratio of the image of the real world based on an elapsed time from when the user performed the operation to specify the region.

According to a technique recited in claim 6 of the present application, after a fixed time elapses from when the user performed the operation to specify the region, the image generation unit of the image display device according to claim 5 is configured to switch the corresponding region from the image $R_I$ of the real world to the image $R_V$ of the virtual world, or alternatively, gradually revert the corresponding region back to the image $R_V$ of the virtual world.

According to a technique recited in claim 7 of the present application, the image display device according to claim 4 further includes: an input unit configured to accept an input operation by the user. The region specification unit is configured to specify the region in which to display the image of the real world based on an operation by the user with respect to the input unit.

According to a technique recited in claim 8 of the present application, the input unit of the image display device according to claim 7 is a touch panel. The region specification unit is configured to specify a region corresponding to a location where the user touched the touch panel.

According to a technique recited in claim 9 of the present application, the touch panel of the image display device according to claim 8 is disposed behind a display screen of the display unit.

According to a technique recited in claim 10 of the present application, the region specification unit of the image display device according to claim 4 is configured to specify the region in which to display the image of the real world based on a gesture operation by the user.

According to a technique recited in claim 11 of the present application, the region specification unit of the image display device according to claim 4 is configured to change the region in which to display the image of the real world according to an operation by the user on a boundary between the image of the real world and the image of the virtual world.

According to a technique recited in claim 12 of the present application, the image display device according to claim 1 further includes: an object detection unit configured to detect an object in the real world; and a three-dimensional model calculation unit configured to generate a three-dimensional model $M_I$ of a certain range including the object on a basis of the image of the real world acquired by the real world image acquisition unit, and also calculate a region $R_V$ of a virtual space V corresponding to a location where the object was detected. The image generation unit is configured to calculate a three-dimensional model $M_M$ in which the three-dimensional model $M_I$ of the object is placed in the corresponding region $R_V$ of a three-dimensional model V of the virtual world, and conduct a rendering process.

According to a technique recited in claim 13 of the present application, the object detection unit of the image display device according to claim 12 is configured to detect a part of the user's body, or alternatively, a predetermined physical body in the real world.

According to a technique recited in claim 14 of the present application, the object detection unit of the image display device according to claim 12 is configured to detect a physical body in the real world within a fixed distance from the image display device.

According to a technique recited in claim 15 of the present application, the image generation unit of the image display device according to claim 12 is configured to control a mixture ratio of the image of the real world based on an elapsed time from when the object detection unit detected the object.

According to a technique recited in claim 16 of the present application, the region specification unit of the image display device according to claim 12 is configured to operate a boundary on a condition that a current position of the object overlaps with a boundary between the three-dimensional model $M_I$ of the real world and the virtual world V.

A technique recited in claim 17 of the present application is an image display method including: a real world image acquisition step of acquiring an image of a real world; a region specification step of specifying a region in which to display the image of the real world; an image generation step of mixing the image of the real world into a virtual image on a basis of the specified region, and generating an image; and a display step of displaying the generated image on a display unit disposed at an eye position of a user.

A technique recited in claim 18 of the present application is an image display method including: a real world image acquisition step of acquiring an image of a real world; a region specification step of specifying a region in which to display the image of the real world; a virtual world image generation step of generating an image of a virtual world; a region image generation step of calculating an image $R_I$ of the real world and an image $R_V$ of the virtual world corresponding to the region specified in the region specification step; an image generation step of generating an image by replacing the image $R_V$ of a corresponding region of a virtual world rendering result V with the image $R_I$ of the corresponding region of the real world; and a display step of displaying the generated image on a display unit disposed at an eye position of a user.

A technique recited in claim 19 of the present application is an image display method including: a real world image acquisition step of acquiring an image of a real world; an object detection step of detecting an object in the real world; and a region specification step of specifying a corresponding region $R_V$ of a three-dimensional model V of the virtual world of the detected object; a three-dimensional model calculation step of generating a three-dimensional model $M_I$ of a certain range including the object on a basis of the image of the real world acquired by the real world image acquisition unit, and also calculating the region $R_V$ of a virtual space V corresponding to a location where the object was detected; an image generation step of calculating a three-dimensional model $M_M$ in which the three-dimensional model $M_I$ of the object is placed in the corresponding region $R_V$ of the three-dimensional model V of the virtual world, and conducting a rendering process to thereby generate an image; and a display step of displaying the generated image on a display unit disposed at an eye position of a user.

Advantageous Effects of Invention

According to the technology disclosed in this specification, it is possible to provide an excellent image display device worn on a user's head or face and used to view images, and also enabling the user to observe phenomena occurring in the outside world, as well as an image display method.

According to the technology disclosed in this specification, an image display device is configured to display images of the real world captured with a camera or the like mixed with images of the virtual world. Consequently, a user wearing the image display device on his or her head or face is able to observe the outside world, or in other words the real world, even while images are being displayed. In addition, an image display device applying the technology disclosed in this specification enables interaction with the real world without diminishing the sense of immersion into the images being viewed, or in other words the virtual world. In addition, even if a user wearing the image display device on his or her head or face makes body movements in the real world while immersed in the virtual world, the user is still able to observe the real world, thereby reducing the risk of physical harm caused by body movements.

Note that the advantageous effects described in this specification are merely for the sake of example, and the advantageous effects of the present invention are not limited thereto. Furthermore, in some cases the present invention may also exhibit additional advantageous effects other than the advantageous effects given above.

Further objectives, features, and advantages of the technology disclosed in this specification will be clarified by a more detailed description based on the exemplary embodiments discussed hereinafter and the attached drawings.

DESCRIPTION OF EMBODIMENT(S)

Hereinafter, an embodiment of the technology disclosed in this specification will be described in detail and with reference to the drawings.

Figure 1:
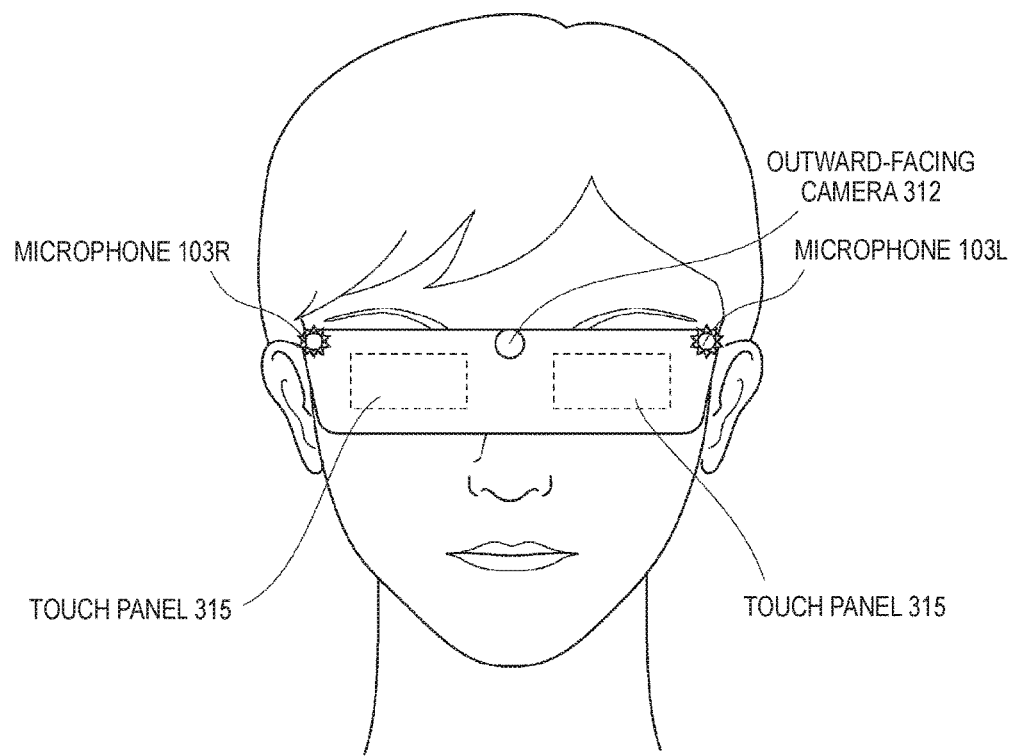
FIG. 1 is a diagram illustrating a front view of a user wearing a head-mounted display 100 on his or her head.

FIG. 1 illustrates a front view of a user wearing, on his or her head, a head-mounted display 100 applying technology disclosed in this specification.

The head-mounted display 100 directly covers the user's eyes when worn on the user's head or face, thereby imparting a sense of immersion to the user when viewing images. In addition, unlike the see-through type, the user wearing the head-mounted display 100 is unable to see his or her surroundings in the real world directly. However, by providing an outward-facing camera 312 that captures the surroundings in the direction of the user's gaze, and displaying the captured image, the user is able to see his or her surroundings in the real world indirectly (that is, the surroundings are displayed by video see-through). Obviously, a virtual display image, such as an AR image, may also be overlaid onto the video see-through image and presented. In addition, since the display image is not visible from the outside (in other words, by other people), privacy with regard to information display is easily protected.

The head-mounted display 100 illustrated in FIG. 1 is structured to resemble a hat, and is configured to cover the wearing user's left and right eyes directly. At a position opposing the left and right eyes on the internal side of the head-mounted display 100, a display panel that the user views (not illustrated in FIG. 1) is disposed. The display panel is made up of a microdisplay such as organic electro-luminescence (EL) elements or a liquid crystal display, or a laser-scanning display such as a retinal scanning display.

Near the center of the front face of the head-mounted display 100, an outward-facing camera 312 used to input an image of the surroundings (the user's field of vision) is disposed. In addition, microphones 103L and 103R are respectively disposed near the left and right edges of the main body of the head-mounted display 100. By providing the microphones 103L and 103R approximately symmetrically from left to right, it is possible to recognize just the audio positioned in the center (the user's voice), and thereby separate out ambient noise and speech by other people to prevent accidental operation when performing operations by speech input, for example.

In addition, on the outside of the main body of the head-mounted display 100, there is disposed a touch panel 315 enabling the user to perform touch input using a fingertip or the like. In the illustrated example, a pair of left and right touch panels 315 are provided, but a single touch panel 315 or three or more touch panels 315 may also be provided.

Figure 2:
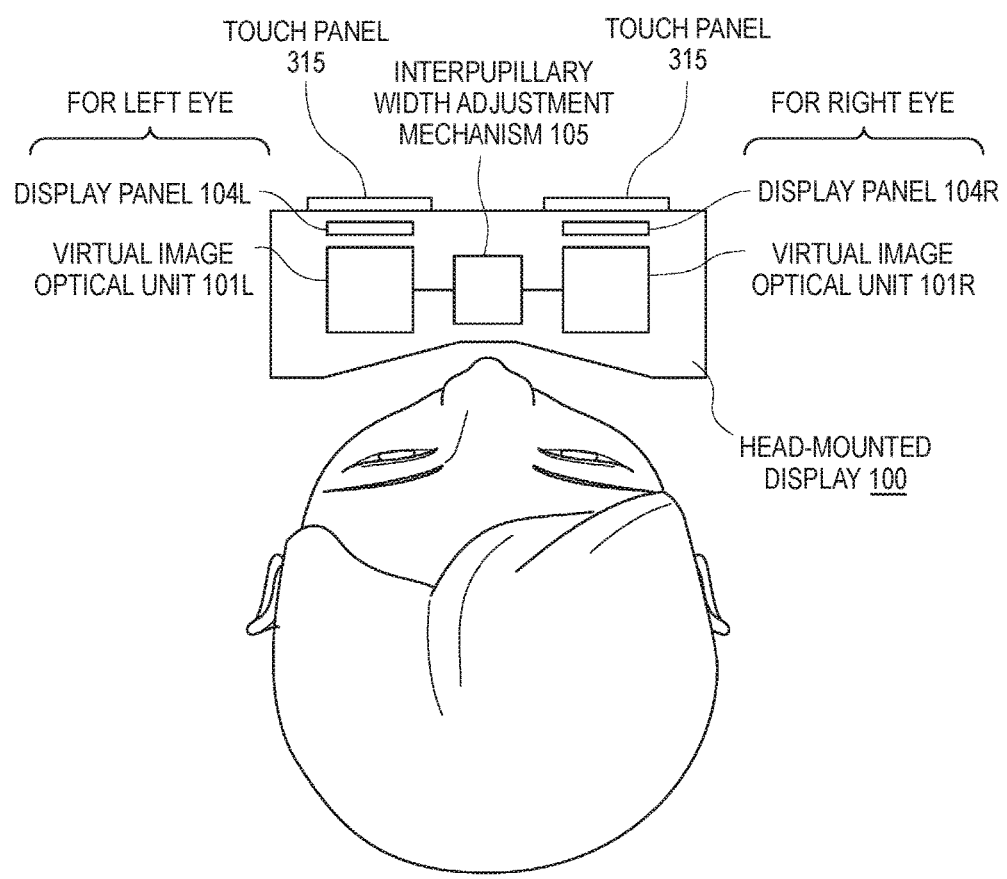
FIG. 2 is a diagram illustrating a top view of the user wearing the head-mounted display 100 illustrated in FIG. 1.

FIG. 2 illustrates a top view of the user wearing the head-mounted display 100 illustrated in FIG. 1. The head-mounted display 100 illustrated in the drawing has display panels 104L and 104R for the left eye and the right eye on the side that faces the user's face. The display panels 104L and 104R are made up of a microdisplay such as organic electro-luminescence (EL) elements or a liquid crystal display, or a laser-scanning display such as a retinal scanning display. In front of the left and right display panels 104L and 104R, virtual image optical units 101L and 101R are disposed, respectively. The virtual image optical units 101L and 101R focus an enlarged virtual image of the display images of the display panels 104L and 104R on the user's left and right eyes, respectively. The user then views an image by combining the left and right enlarged virtual images in his or her mind. Also, since the height of the eyes and interpupillary width differ among individual users, it is necessary to align each of the left and right display systems with the user's eyes. In the example illustrated in FIG. 2, an interpupillary width adjustment mechanism 105 is provided between the display panel for the right eye and the display panel for the left eye.

Figure 3:
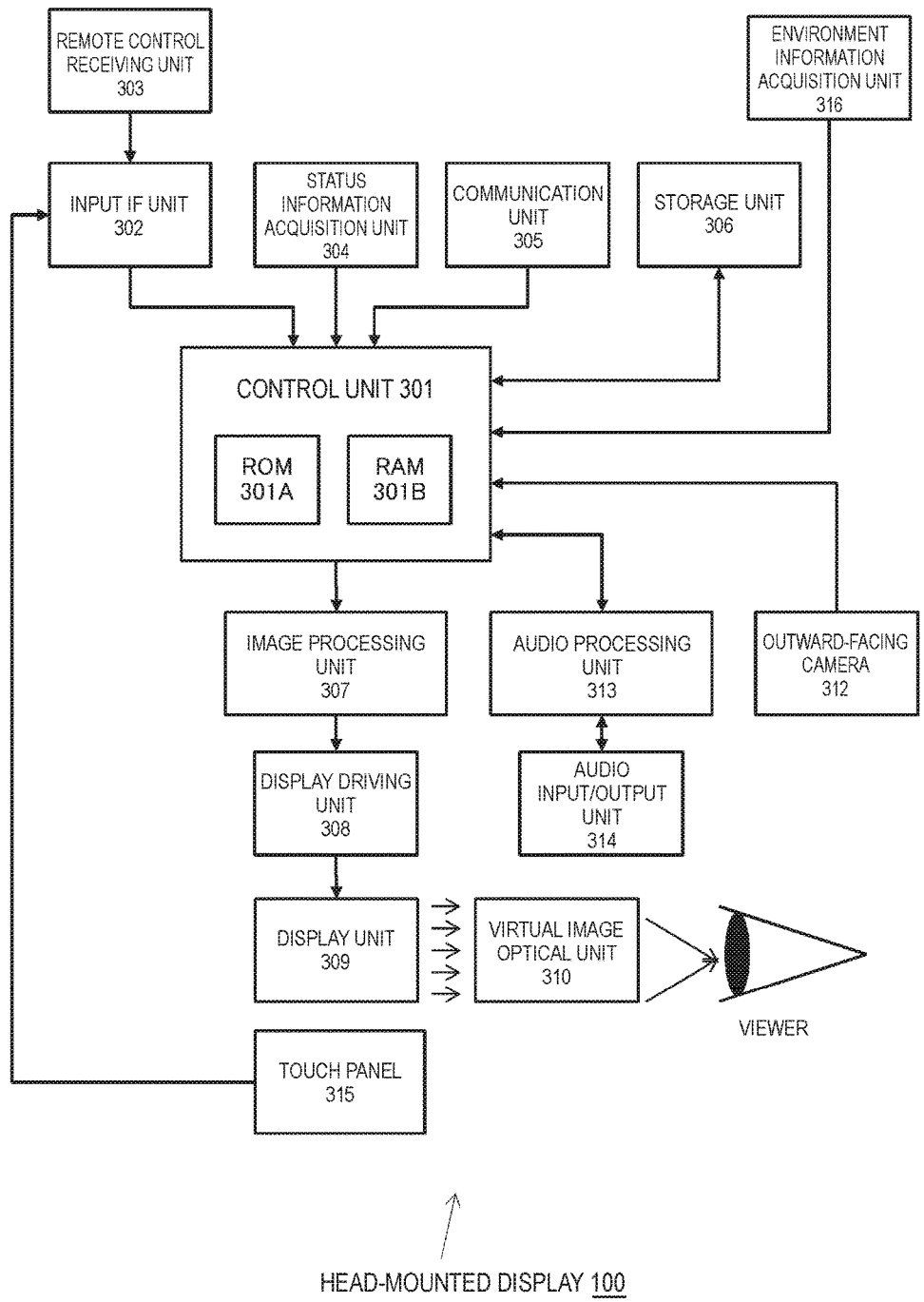
FIG. 3 is a diagram illustrating an example of an internal configuration of the head-mounted display 100.

FIG. 3 illustrates an example of an internal configuration of the head-mounted display 100. Hereinafter, the respective components will be described.

A control unit 301 is equipped with read-only memory (ROM) 301A and random access memory (RAM) 301B. The ROM 301A stores program code executed by the control unit 301, and various data. The control unit 301, by executing a program loaded into the RAM 301B from the ROM 301A or a storage unit 306 (discussed later), controls the display of images, and also centrally controls the operation of the head-mounted display 100 overall. The program and data stored in the ROM 301A may be an image display control program for video playback or the like, an interaction control program that enables the user viewing the display image to interact with the real world, identification information unique to the relevant head-mounted display 100, user attribute information for the user using the relevant head-mounted display 100, and the like.

The input interface (IF) unit 302 is equipped with one or more operating elements on which the user performs an input operation, such as keys, buttons, and switches (none illustrated), receives user instructions via the operating elements, and outputs to the control unit 301. Also, the input interface unit 302 receives user instructions made up of remote control commands received by the remote control receiving unit 303, and outputs to the control unit 301.

Also, if the user performs a touch operation with a fingertip on the touch panel 315 disposed on the outside of the main body of the head-mounted display 100, the input interface unit 302 outputs input information such as coordinate data of the touched fingertip position to the control unit 301. For example, if the touch panel 315 is disposed on the front face of the main body of the head-mounted display 100, directly behind the display image of the display unit 309 (the enlarged virtual image viewed through the virtual image optical unit 310), the user is able to perform touch operations with a sense of touching the display image with his or her fingertip.

The status information acquisition unit 304 is a function module that acquires status information about the head-mounted display 100 itself or the user wearing the head-mounted display 100. The status information acquisition unit 304 may be equipped with various sensors for detecting its own status information, or be configured to acquire status information via a communication unit 305 (discussed later) from external equipment equipped with some or all of such sensors (for example, a smartphone, wristwatch, or some other multi-function terminal being worn by the user).

The status information acquisition unit 304 acquires information about the position and orientation or information about the orientation of the user's head, for example, in order to track the user's head movements. To track the user's head movements, the status information acquisition unit 304 is taken to be a sensor including a three-axis gyro sensor, a three-axis acceleration sensor, and a three-axis geomagnetic sensor, for a total of nine detectable axes, for example. In addition, the status information acquisition unit 304 may further combine and use the above with one or multiple other sensors such as a Global Positioning System (GPS) sensor, a Doppler sensor, an infrared sensor, or a radio field intensity sensor. In addition, the status information acquisition unit 304 may further combine and use the acquisition of position and orientation information with information provided by various infrastructure, such as mobile phone base station information or PlaceEngine (registered trademark) information (radio field intensity measurement information from a wireless LAN access point). In the example illustrated in FIG. 3, the status information acquisition unit 304 for head movement tracking is built into a head-mounted display 100, but may also be configured by an accessory part of the like that is externally attached to the head-mounted display 100. In the latter case, the status information acquisition unit 304 expresses head orientation information in the form of rotation matrices, for example, and transmits the head orientation information to the main head-mounted display 100 by wireless communication such as Bluetooth (registered trademark) communication, or by a high-speed wired interface such as Universal Serial Bus (USB).

In addition, besides tracking the user's head movements as discussed above, the status information acquisition unit 304 may also acquire other information as status information about the user wearing the head-mounted display 100, such as the user's operating status (whether or not the user is wearing the head-mounted display 100), the user's behavioral status (a movement status such as being still, walking, or running, gestures made with the hands or fingers, the open/closed status of the eyelids, the gaze direction, and the size of the pupils), the psychological status (such as a degree of impression, a degree of excitement, a degree of alertness, feelings, and emotions, such as whether the user is immersed in or concentrating on viewing the displayed image), as well as the physiological status. In addition, in order to acquire this status information from the user, the status information acquisition unit 304 may also be equipped with various status sensors such as a wear sensor made up of the outward-facing camera 312, a mechanical switch or the like, an inward-facing camera that photographs the user's face, a gyro sensor, an acceleration sensor, a velocity sensor, a pressure sensor, a temperature sensor that senses body temperature or air temperature, a sweat sensor, a pulse sensor, a myoelectric potential sensor, an oculo-electric potential sensor, a brain wave sensor, a breath sensor, and a gas ion concentration sensor, as well as a timer (none illustrated in the drawing).

The environment information acquisition unit 316 is a function module that acquires information related to the environment surrounding the main body of the relevant head-mounted display 100 or the user wearing the relevant head-mounted display 100. Herein, the information related to the environment may be sound, air flow, air temperature, air pressure, atmosphere (smoke or fog, electromagnetic waves (ultraviolet light, blue light, radio waves) flooding the relevant head-mounted display 100 or the user, heat rays (infrared), radiation, atmospheric carbon monoxide, carbon dioxide, oxygen, and nitrogenous compounds (nicotine), nitrogen oxides ($NO_x$) and hydrocarbons (volatile organic compounds (VOC)) floating in the atmosphere or photochemical smog generated by inducing a photochemical reaction in these due to the effect of ultraviolet light, particulate matter, pollen, fine particles such as house dust, and hazardous chemical substances such as asbestos), and other environmental factors. To detect environment information, the environment information acquisition unit 316 may be equipped with a sound sensor and an air flow sensor, as well as various types of environmental sensors. The microphones and the outward-facing camera 312 discussed earlier may also be included among the environmental sensors. Alternatively, the environment information acquisition unit 316 may be configured to acquire environment information via a communication unit 305 (discussed later) from external equipment equipped with some or all of such sensors (for example, a smartphone, wristwatch, or some other multi-function terminal being worn by the user).

The outward-facing camera 312 is disposed near the center of the front face of the main unit of the head-mounted display 100, for example (see FIG. 1), and is able to capture an image of the surroundings. The user is taken to be able to adjust the zoom of the outward-facing camera 312 through an input operation via the input interface unit 302, or by pupil magnitude or voice input recognized by a device such as an inward-facing camera or a myoelectric sensor. In addition, by performing orientation control in the pan, tilt, and roll directions of the outward-facing camera 312 to match the user's gaze direction acquired by the status information acquisition unit 304, it is possible to capture an image of the user's own gaze, or in other words an image in the user's gaze direction, with the outward-facing camera 312. The captured image from the outward-facing camera 312 may be output for display by the display unit 309, and the captured image may also be transmitted from the communication unit 305 or saved in the storage unit 306.

More preferably, the outward-facing camera 312 is made up of multiple cameras to enable the outward-facing camera 312 to acquire three-dimensional information about the image of the surroundings by using parallax information. Also, even if a single camera is used, simultaneous localization and mapping (SLAM) image recognition may also be used to capture images while moving the camera, compute parallax information using multiple frame images succeeding each other in time (see Patent Literature 3, for example), and acquire three-dimensional information about the image of the surroundings from the computed parallax information.

The outward-facing camera 312 is able to acquire three-dimensional information, and thus may also be used as a distance sensor. Alternatively, a distance sensor made up of an inexpensive device such as a position sensitive detector (PSD) that detects a reflected signal from an object, for example, may be used in conjunction with the outward-facing camera 312. The outward-facing camera 312 and the distance sensor may be used to detect the position, orientation, and shape of the body of the user wearing the head-mounted display 100.

The communication unit 305 conducts a communication process with external equipment, as well as modulation/demodulation and coding/decoding processes on communication signals. The external equipment may be a content playback device (Blu-ray Disc or DVD player) that supplies viewing content when the user uses the head-mounted display 100, a multi-function terminal such as a smartphone, a game console, or a streaming server. Also, the control unit 301 transmits transmission data to external equipment from the communication unit 305.

The configuration of the communication unit 305 is arbitrary. For example, the communication unit 305 may be configured according to a communication scheme used for transmitting and receiving operations with external equipment that acts as a communication peer. The communication scheme may be either wired or wireless. The communication standard referred to herein may be a standard such as Mobile High-Definition Link (MHL), Universal Serial Bus (USB), High-Definition Multimedia Interface (HDMI; registered trademark), Bluetooth (registered trademark) communication or Bluetooth (registered trademark) Low Energy (BLE) communication, ultra-low-power wireless communication such as ANT, or a mesh network standardized by IEEE 802.11s or the like. Alternatively, the communication unit 305 may be a cellular radio transceiver that operates in accordance with an established standard such as Wideband Code Division Multiple Access (W-CDMA) or Long Term Evolution (LTE), for example.

The storage unit 306 is a mass storage device such as a solid-state drive (SSD). The storage unit 306 stores application programs executed by the control unit 301, and various data. For example, content viewed by the user using the head-mounted display 100 is stored in the storage unit 306.

The image processing unit 307 additional conducts signal processing such as image quality correction on an image signal output from the control unit 301, and also converts the image signal to a resolution suited to the screen of the display unit 309. Subsequently, the display driving unit 308 sequentially selects the pixels of the display unit 309 every row while performing line-sequential scanning, and supplies a pixel signal based on the processed image signal.

The display unit 309 includes a display panel made up of a microdisplay such as organic electro-luminescence (EL) elements or a liquid crystal display, or alternatively, a laser-scanning display such as a retinal scanning display. The virtual image optical unit 310 enlarges and projects the display image of the display unit 309, enabling the user to view the display image as an enlarged virtual image.

Note that the display image output by the display unit 309 may be commercial content (virtual world) supplied from a content playback device (Blu-ray Disc or DVD player), a multi-function terminal such as a smartphone, a game console, or a streaming server, a captured image (real world) from the outward-facing camera 312, or the like.

The audio processing unit 313 performs audio quality correction and audio amplification on an audio signal output from the control unit 301, and additionally performs signal processing on signals such as an input audio signal. Additionally, the audio input/output unit 314 externally outputs the processed audio, and also accepts audio input from a microphone (described above).

The head-mounted display 100 as illustrated in FIGS. 1 and 2 is opaque, or in other words, covers the eyes of the wearing user. Additionally, video content such as a movie or images expressed by technology such as computer graphics are displayed on the display unit 309. The virtual image optical unit 310 enlarges and projects the display image of the display unit 309, enabling the user to view the display image as an enlarged virtual image having a suitable angle of view, and recreating the sense of being in a movie theater, for example. The user is able to have an immersive experience of the virtual world displayed on the display unit 309.

However, when the user is immersed in the virtual world, there are concerns about losing interaction with the real world. If only part of the user's perception, such as vision and hearing, is experiencing the virtual world even though the users body exists in the real world, the user feels psychological resistance. Also, since the user's vision and hearing are directed at the virtual world, awareness of events such as contact or collision with objects in the real world becomes difficult, and there is a risk of receiving physical harm. Obviously, since the user is drawn into a virtual world to some extent with not only opaque but also see-through head-mounted displays, the problems of psychological resistance and risk of physical harm are similar.

Accordingly, in the present embodiment, when displaying an image of the virtual world such as a movie or computer graphics with the display unit 309, the head-mounted display 100 mixes in an image of the outside world, or in other words the real world, captured with the outward-facing camera 312. Consequently, by looking at the image of the real world mixed in with the image of the virtual world, the user is able to perceive the real world and suitably interact with the real world, thereby making it possible to lessen psychological resistance while also avoiding physical harm due to events such as collisions with objects in the real world.

Embodiment 1

In the first embodiment, the head-mounted display 100 replaces a partial, user-specified region out of the display region of the display unit 309 displaying an image of the virtual world with an image of the real world captured with the outward-facing camera 312 for display.

The image displayed by the display unit 309 (the image viewed by the user's eyes via the virtual image optical unit 310) is a combination of information about the virtual world, such as playback images of commercial content, and information about the real world captured with the outward-facing camera 312. Consequently, the user is able to grasp the surrounding environment (events occurring in reality in the vicinity of oneself) continuously, without interrupting the state of immersion into the virtual world expressed by the content. The displayed image of the real world is basically a live image captured with the outward-facing camera 312, but may also be a recorded image temporarily stored in the storage unit 306.

Note that the display of an image of the real world in the region specified by the user is temporary. For example, the entire display region of the display unit 309 may be reverted to the image of the virtual world according to an explicit operation to cancel the region specification by the user. Alternatively, the display may be switched from the image of the real world to the image of the virtual world after a fixed time elapses from when the user specified a region, or the display may be reverted to the image of the virtual world gradually (for example, while varying a mixture ratio of the image of the real world and the image of the virtual world). The image of the virtual world is reverted according to the elapsing of time because after a fixed time elapses from when the user performed the operation, the user is assumed to not require the display of the real world any more.

In addition, the method by which the user specifies the region in which to display the image of the real world is arbitrary. For example, the user may operate buttons included on the input interface unit 302 to specify the region to replace with the real world. For example, the region to replace with the real world may be moved up, down, left, and right according to operations on directional keys. Alternatively, the region corresponding to a location where the user performed a touch operation with a fingertip on the touch panel 315 may be replaced with the real world. Alternatively, a gesture that the user performs using a hand or the like may be captured with the outward-facing camera 312, and a region designated by the gesture may be replaced with the real world.

Figure 4:
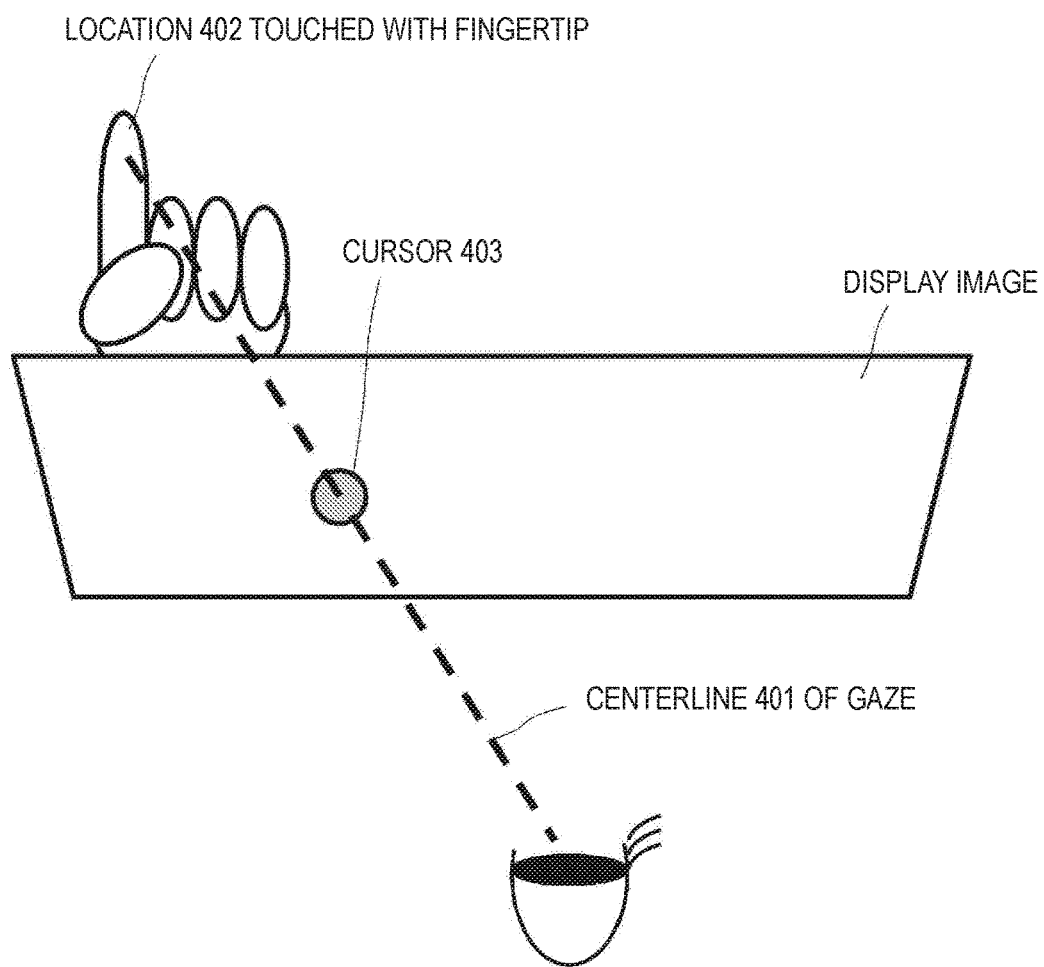
FIG. 4 is a diagram illustrating how a cursor is placed on the display image formed in the user's mind so that a centerline of gaze, the cursor, and an operating finger lie on the same line.

For example, if the touch panel 315 is disposed on the front face of the main body of the head-mounted display 100, directly behind the display image of the display unit 309 (the enlarged virtual image viewed through the virtual image optical unit 310), the user is able to perform touch operations with a sense of touching the display image with his or her fingertip. More specifically, when a cursor is displayed at a position corresponding to the location where the touch panel 315 was touched, as illustrated in FIG. 4, if the cursor 403 is placed so that the centerline 401 of the gaze (viewing the enlarged virtual image formed in the user's mind) and the location 402 touched with a fingertip lie on the same line, the user is able to designate a desired location on the display region with a sense of directly touching the display image from behind (see Patent Literature 4, for example).

Figure 5:
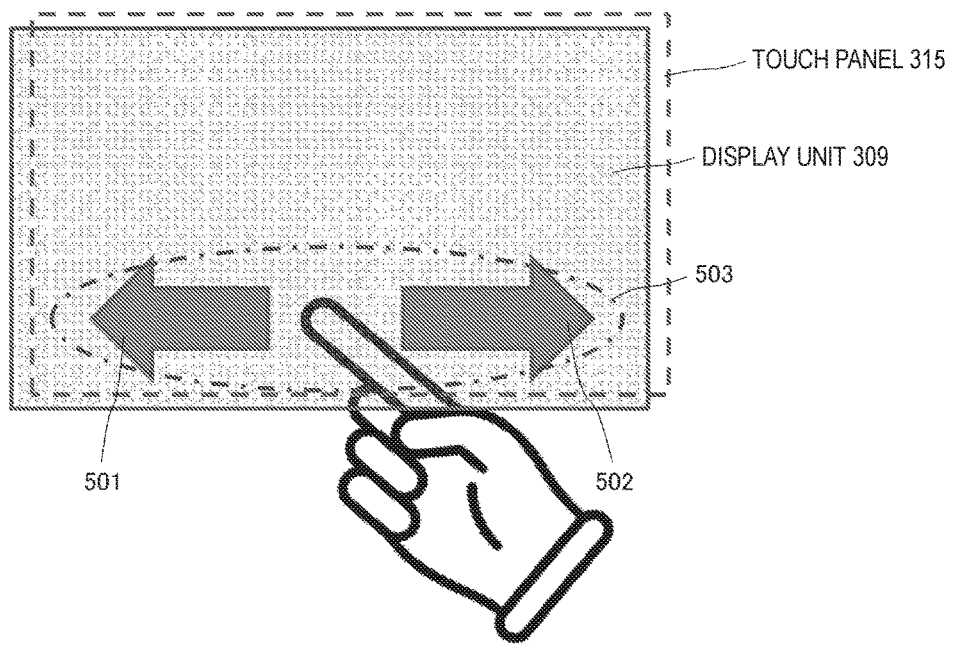
FIG. 5 is a diagram illustrating how the user uses a touch panel 315 to specify a region in which to display an image of the real world.

FIG. 5 illustrates how the user uses a touch panel 315 to specify a region in which to display an image of the real world. While the display unit 309 is displaying only the image of the virtual world, the user moves a fingertip on the touch panel 315 behind the display unit 309, and specifies a desired location 503 at which to display the real world, as indicated by the reference numbers 501 and 502.

Figure 6:
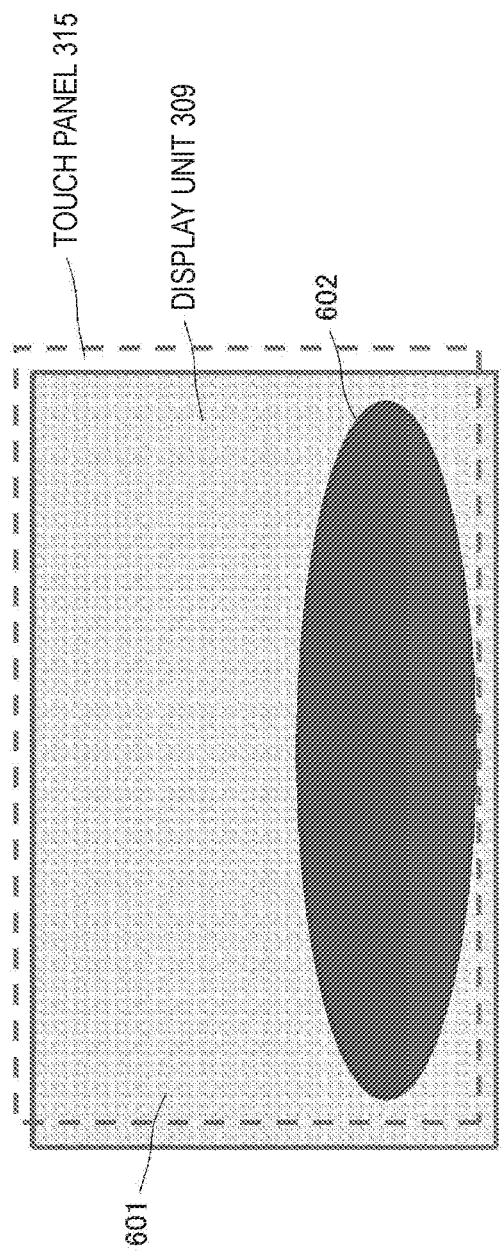
FIG. 6 is a diagram illustrating how a region 602 specified by a user operation from an image 601 of a virtual world displayed by a display unit 309 is replaced with an image of the real world.

FIG. 6 illustrates how the inside of a region 602 specified by the user operation illustrated in FIG. 5 from an image 601 of the virtual world displayed by the display unit 309 is replaced with the image of the real world captured with the outward-facing camera 312. The image displayed by the display unit 309 is a combination of information about the virtual world and information about the real world. Consequently, the user is able to grasp the surrounding environment (events occurring in reality in the vicinity of oneself) continuously, without interrupting the state of immersion into the virtual world expressed by the content.

Figure 7:
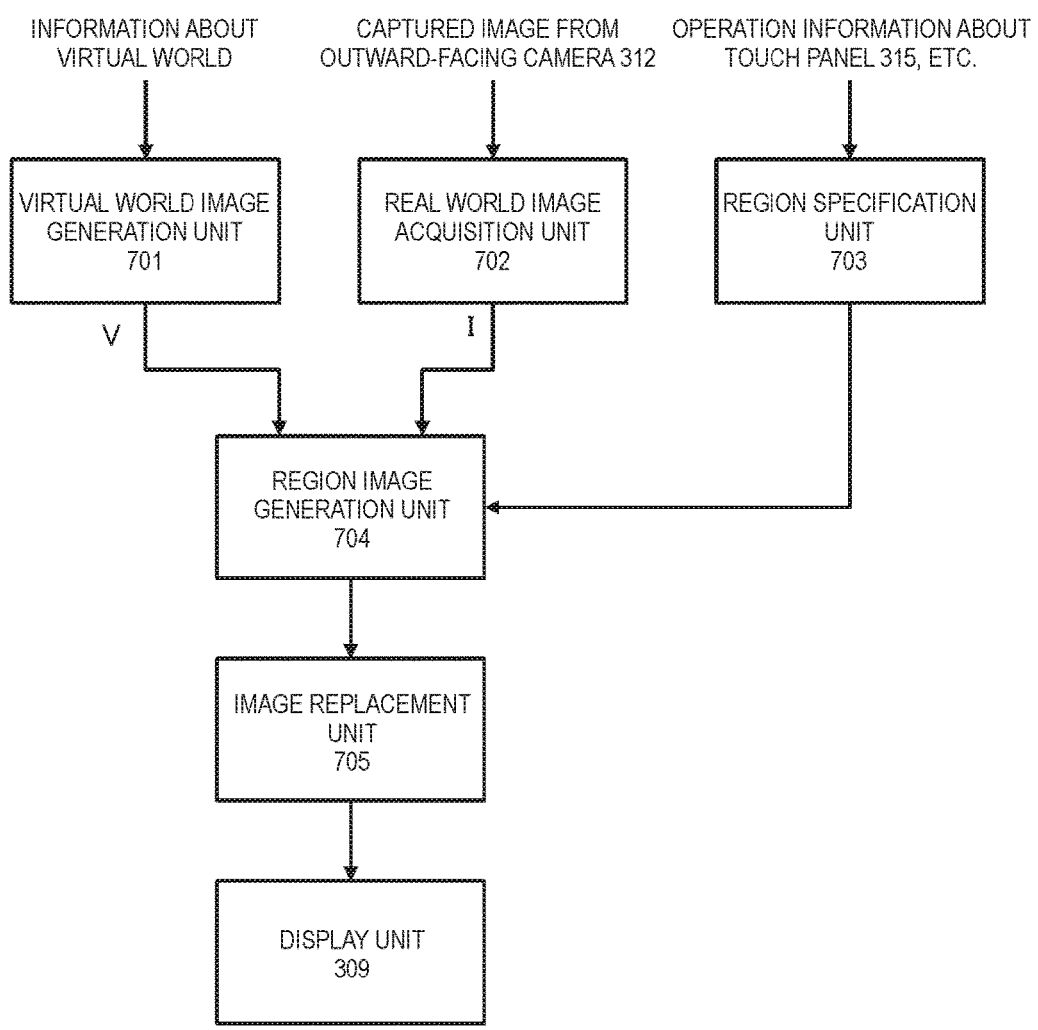
FIG. 7 is a diagram illustrating a functional configuration by which the head-mounted display 100 replaces a partial region of the display region with an image of the real world for display.

FIG. 7 illustrates a functional configuration by which the head-mounted display 100 replaces a partial region of the display region with an image of the real world for display.

A virtual world image generation unit 701 calculates a virtual world rendering result V to be displayed by the display unit 309, on the basis of information about the virtual world stored in advance in the storage unit 306 or received externally with the communication unit 305, for example.

A real world image acquisition unit 702 acquires an image I of the real world around the user, on the basis of data such as an image captured with the outward-facing camera 312.

A region specification unit 703 specifies a region in which to display image information about the real world out of the display screen of the display unit 309, on the basis of a user operation on the touch panel 315 (see FIG. 5), an operation on the input interface unit 302, gesture input, or the like.

A region image generation unit 704 calculates an image $R_I$ of the real world and an image $R_V$ of the virtual world corresponding to the region specified by the region specification unit 703. Subsequently, an image replacement unit 705 synthesizes an image in which the image $R_V$ of the corresponding region of the virtual world rendering result V is replaced by the image $R_I$ of the corresponding region of the real world. The synthesized image is displayed on the display unit 309.

Note that each of the above function blocks 701 to 705 is realized by a program executed by the control unit 301, for example, but may also be configured as dedicated hardware.

Figure 8:
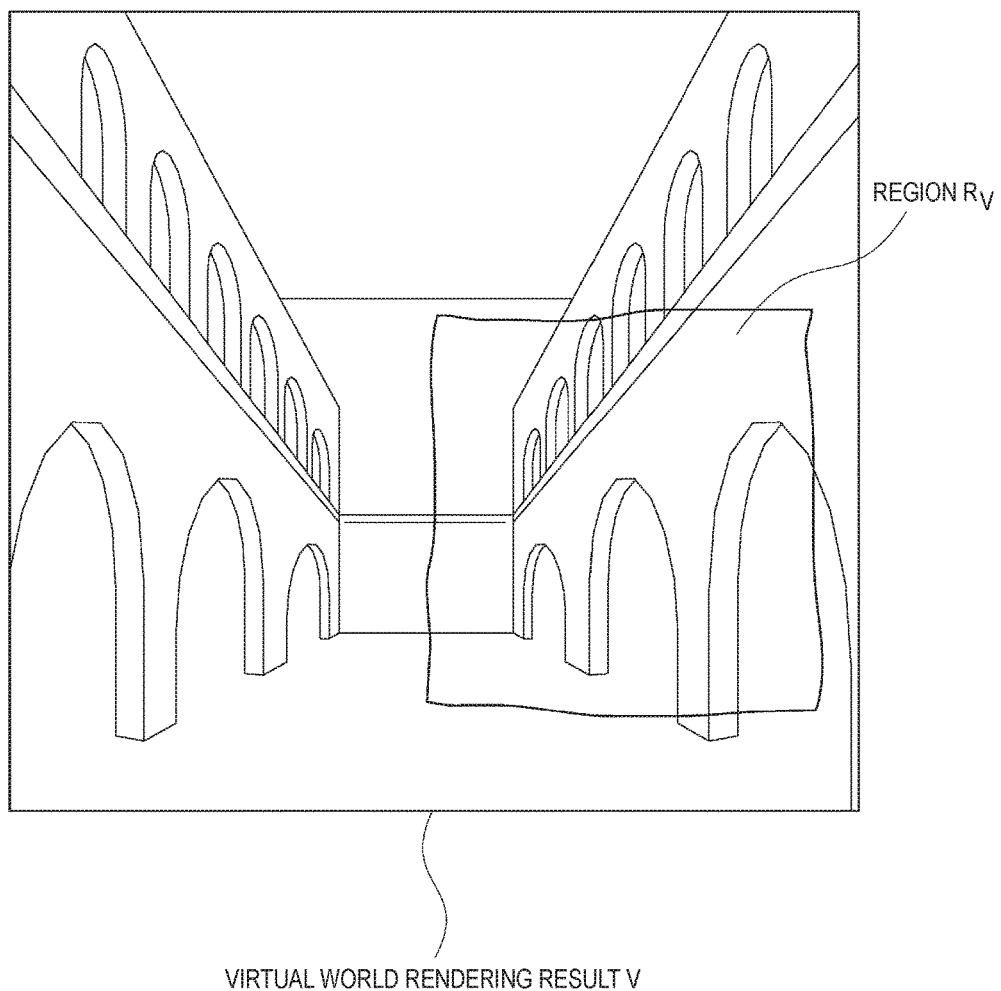
FIG. 8 is a diagram illustrating an example of a virtual world rendering result V, and an image $R_V$ of a corresponding region in a region specified by the user.
Figure 9:
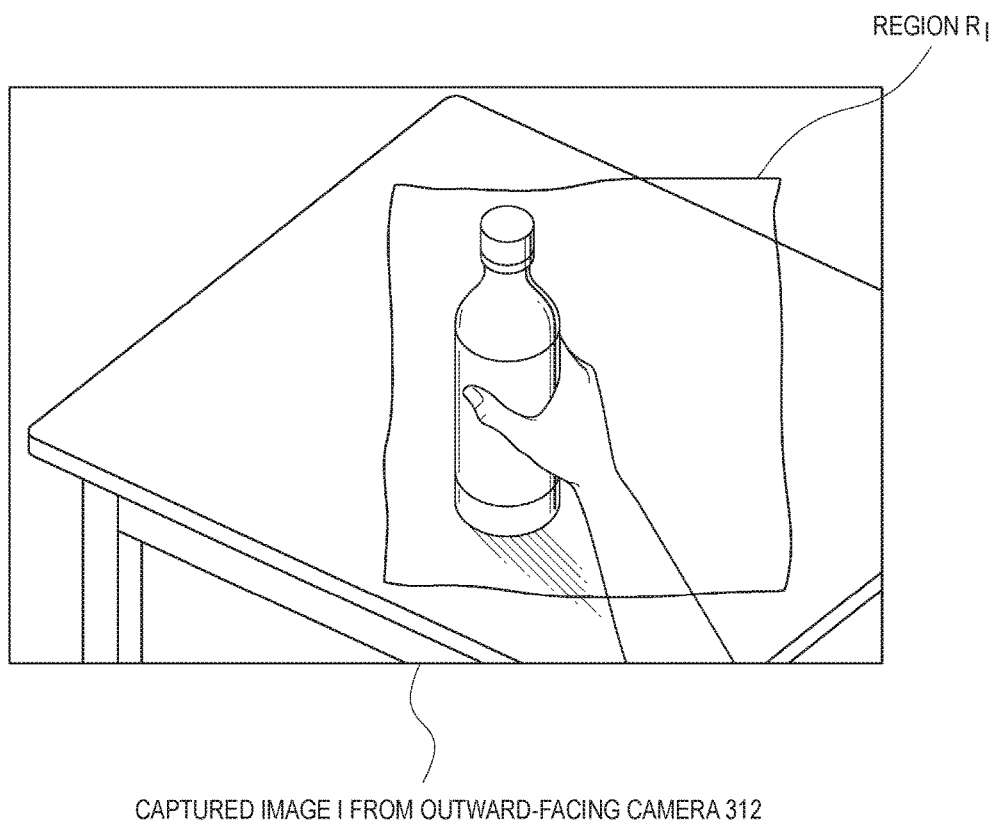
FIG. 9 is a diagram illustrating an example of an image I of the real world captured by an outward-facing camera 312, and an image $R_I$ of a region corresponding to a region specified by the user.
Figure 10:
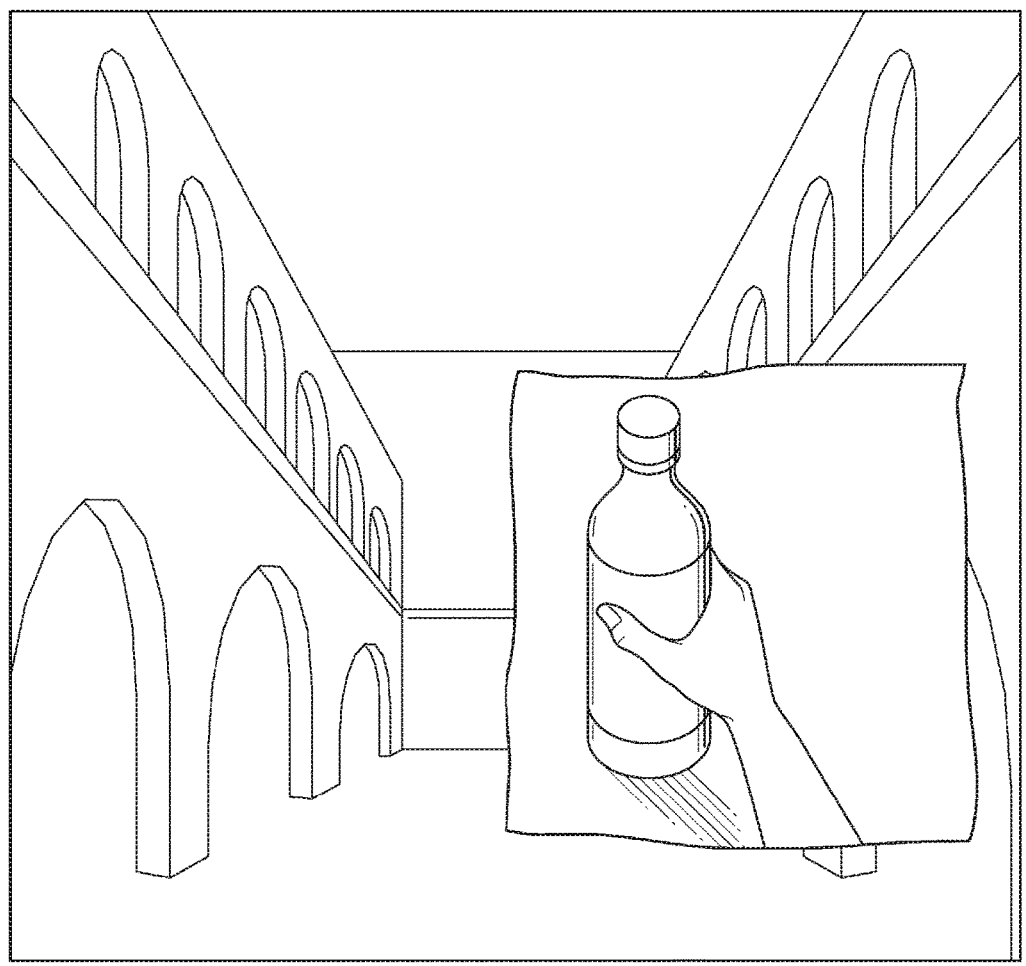
FIG. 10 is a diagram illustrating an example of a display image in which the image $R_V$ of the corresponding region of the virtual world rendering result V has been replaced by the image $R_I$ of the corresponding region of the real world.

FIG. 8 illustrates an example of the virtual world rendering result V, and the image $R_V$ of the corresponding region in the region specified by the user. Also, FIG. 9 illustrates an example of the image I of the real world captured by the outward-facing camera 312, and the image $R_I$ of the region corresponding to the region specified by the user. Also, FIG. 10 illustrates an example of a display image in which the image $R_V$ of the corresponding region of the virtual world rendering result V has been replaced by the image $R_I$ of the corresponding region of the real world.

Figure 11:
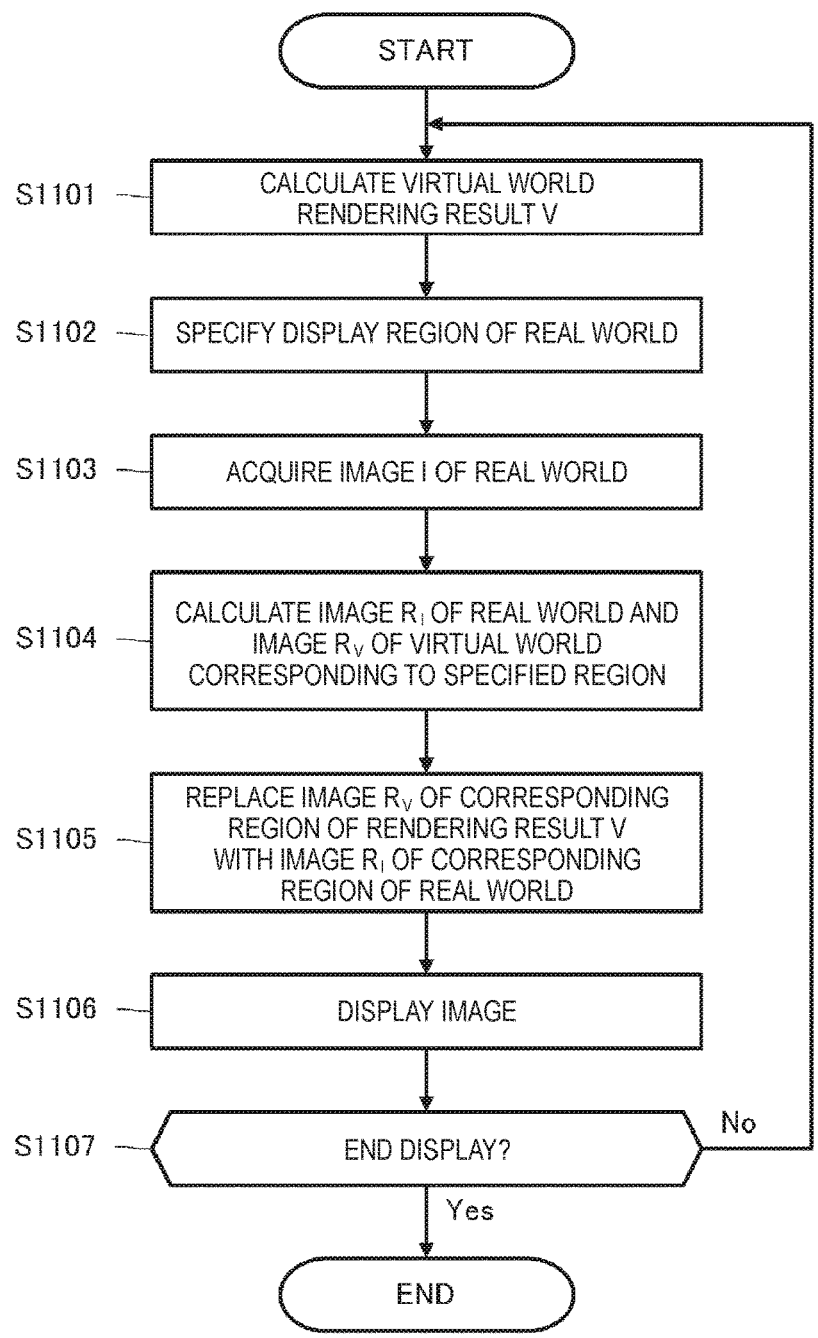
FIG. 11 is a flowchart illustrating a processing sequence by which the head-mounted display 100 replaces a partial region of the display region with an image of the real world for display.

FIG. 11 illustrates, in flowchart format, a processing sequence by which the head-mounted display 100 replaces a partial region of the display region with an image of the real world for display.

The virtual world image generation unit 701 calculates the virtual world rendering result V (step S1101). Information about the virtual world is made available by being stored in advance in the storage unit 306 or by being received externally with the communication unit 305, for example.

Also, in parallel with the virtual world rendering process, the region specification unit 703 specifies a real world display region on the basis of an operation from the user (step S1102). As discussed above, the user is able to specify the real world display region by performing an operation on the touch panel 315, an operation on the input interface unit 302, gesture input, or the like.

Additionally, while the virtual world rendering process is being conducted and the real world display region is being specified by the user, the real world image acquisition unit 702 acquires an image I of the user's surroundings, or in other words the real world, from data such as an image captured with the outward-facing camera 312 (step S1103).

Subsequently, the region image generation unit 704 calculates the captured image $R_I$ of the real world and the image $R_V$ of the virtual world corresponding to the region specified in step S1102 (step S1104).

Additionally, the image replacement unit 705 replaces the image $R_V$ of the corresponding region of the virtual world rendering result V calculated in step S1101 with the image $R_I$ of the corresponding region of the real world, and generates an image in which an image of the real world is mixed into an image of the virtual world (step S1105). The generated image is displayed by the display unit 309 (step S1106).

The display of the image $R_I$ of the real world in the region specified by the user is temporary. For example, the entire display region of the display unit 309 may be reverted to the image of the virtual world according to an explicit operation to cancel the region specification by the user. Alternatively, the display may be switched to the image $R_V$ of the virtual world after a fixed time elapses from when the user specified a region, or the display may be reverted to the image $R_V$ of the virtual world gradually (for example, while varying a mixture ratio of the image $R_I$ of the real world and the image $R_V$ of the virtual world). The image of the virtual world is reverted according to the elapsing of time because after a fixed time elapses from when the user performed the operation, the user is assumed to not require the display of the real world any more.

Additionally, when continuing to display the image of the virtual world with the display unit 309 (step S1107, No), the process discussed above is returned to step S1101 and repeatedly executed.

Figure 12:
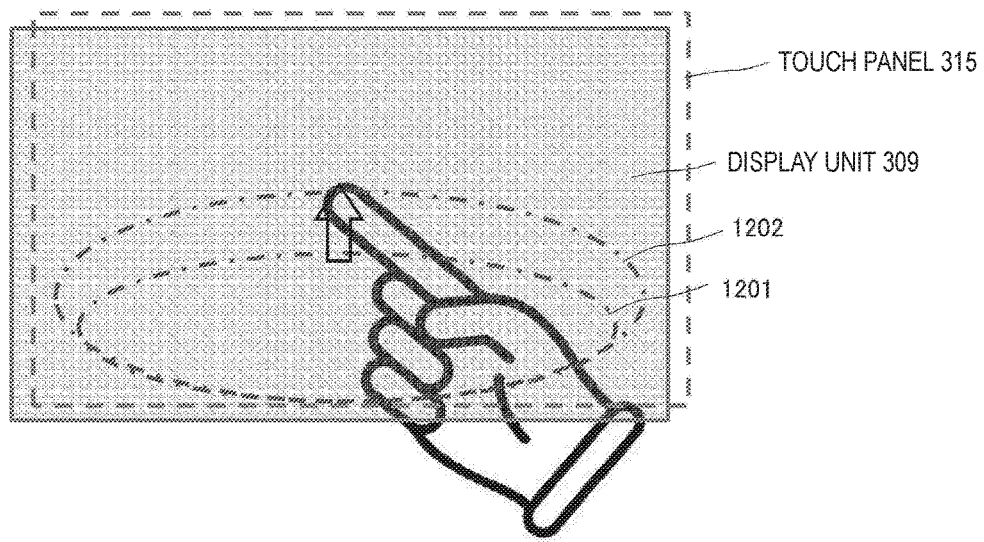
FIG. 12 is a diagram illustrating how the user moves a fingertip designating the boundary of a region 1201 in which to display the real world, thereby enlarging the region 1201 to a region 1202.
Figure 13:
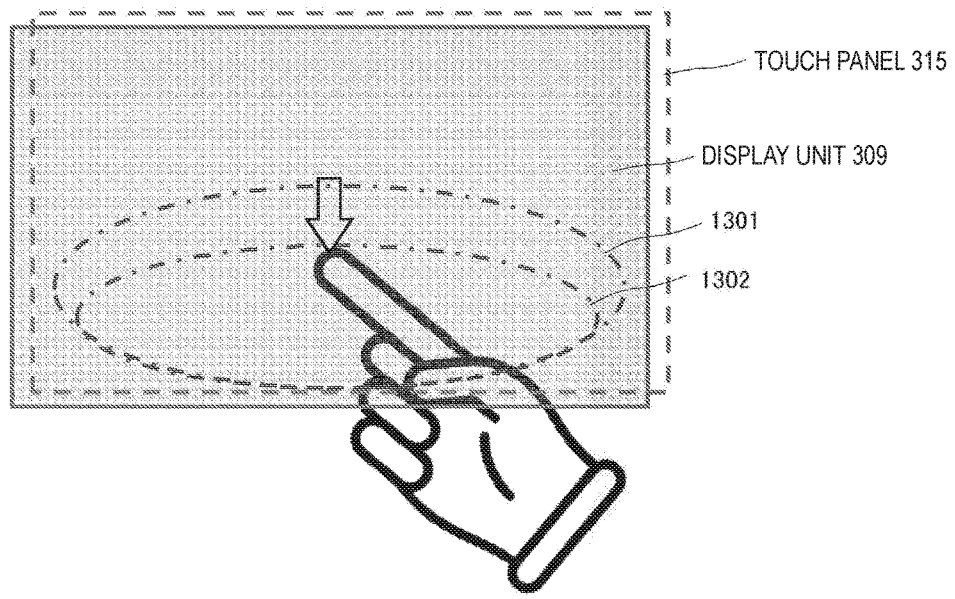
FIG. 13 is a diagram illustrating how the user moves a fingertip designating the boundary of a region 1301 in which to display the real world, thereby reducing the region 1301 to a region 1302.

Note that during the period of displaying the image $R_I$ of the real world, the real world display region is continually updated in step S1102. For example, if the user moves his or her fingertip designating the boundary of the desired region 602 in which to display the real world, in step S1102, the touch panel 315 is able to read the position where the fingertip moved, and enlarge the region 1201 to the region 1202 as illustrated in FIG. 12, or conversely, reduce the region 1301 to the region 1302 as illustrated in FIG. 13. If the user wants to know more about conditions in the real world, the region in which to display the image of the real world may be enlarged by an operation like that illustrated in FIG. 12, whereas if the conditions in the real world become less important, the region in which to display the image of the real world may be reduced by an operation like that illustrated in FIG. 13 to thereby enlarge the region in which to display the virtual world.

As discussed above, according to the head-mounted display 100 in accordance with the first embodiment, the user becomes able to interact with the real world without diminishing the sense of immersion into the virtual world. A user wearing such a head-mounted display 100 is able to lessen his or her psychological resistance against immersing oneself into the virtual world. In addition, the user is able to reduce the risk of physical harm caused by body movements in the real world, even when immersed in the virtual world.

Embodiment 2

In the second embodiment, the head-mounted display 100 displays an image in which a three-dimensional (3D) model of a specific object existing in the real world is placed inside a three-dimensional virtual world. In the first embodiment, an image of the real world is superimposed onto part of the display image of the virtual world (like picture-in-picture). Conversely, the second embodiment differs in that the entire display image is an image of the virtual world. In the second embodiment, a 3D model corresponding to an object in the real world is displayed as an object inside the image of the virtual world. The 3D model is information about the real world, but the object is converted into a 3D model, and thus has a high affinity with the display image of the virtual world.

Herein, the object in the real world is part of the body of the user wearing the head-mounted display 100, such as the right hand, for example. Alternatively, three-dimensional models of a variety of objects in the real world, including a specific person such as an acquaintance of the user, a specific animal such as a pet, a moving body, or a stationary object, may also be placed in the virtual world and displayed. The object to place in the virtual world may be fixed, or be successively selectable by the user. The head-mounted display 100, upon detecting an object in the real world using the outward-facing camera 312 and the distance sensor, tracks the detected object, places a three-dimensional model of the detected object in the virtual world, and conducts a rendering process.

In addition, all physical bodies in the real world within a fixed distance from the head-mounted display 100 may be detected as objects automatically, and a three-dimensional model $M_I$ of such objects may be placed in the virtual world and displayed. For example, as the user brings his or her hand holding a physical body such as a cup close to the head-mounted display 100, the physical body is detected as an object automatically, and as long as the hand remains within a fixed distance from the head-mounted display 100, the physical body is tracked and a three-dimensional model $M_I$ of the physical body is placed in the virtual world and continually displayed. If the hand moves away farther than the fixed distance, the physical body is no longer detected, and the display of the three-dimensional model $M_I$ also disappears. Rather than making the three-dimensional model $M_I$ disappear instantaneously, the transparency may rise gradually with distance and automatically return to the original display of the virtual world only. This is because the display of an object that has moved away farther than the fixed distance is considered to be no longer necessary to the user.

In the second embodiment, the image displayed by the display unit 309 (the image viewed by the user's eyes via the virtual image optical unit 310) is a combination of information about the virtual world, such as playback images of commercial content, and a converted three-dimensional model of information about the real world captured with the outward-facing camera 312. Consequently, the user is able to grasp the surrounding environment (events occurring in reality in the vicinity of oneself) continuously, without interrupting the state of immersion into the virtual world expressed by the content. The three-dimensional model basically is generated on the basis of an object in the real world appearing in a live image captured with the outward-facing camera 312, but may also be generated on the basis of an object in the real world appearing in a recorded image temporarily stored in the storage unit 306.

Whereas the first embodiment combines information about the virtual world and information about the real world with two-dimensional image processing, the second embodiment differs by combining information about the virtual world and information about the real world with a three-dimensional rendering process. Obviously, the second embodiment may also combine the functions of a two-dimensional display and a three-dimensional display of the real world.

Note that the display of an image of the real world in the region corresponding to the location where an object was detected is temporary. For example, if the object is no longer detected in the real world (the object disappears from the visual field or is lost from view), the three-dimensional model corresponding to the object may be removed from the display image of the virtual world, or the three-dimensional model corresponding to the object in the real world may gradually go transparent (for example, while varying a mixture ratio of the image of the real world and the image of the virtual world) to revert back to the original image of the virtual world only. This is because if the object is no longer visible, the user is considered to longer need the display of the real world. Alternatively, the entire display region of the display unit 309 may be reverted to the image of the virtual world according to an explicit operation to cancel the region specification by the user.

Figure 14:
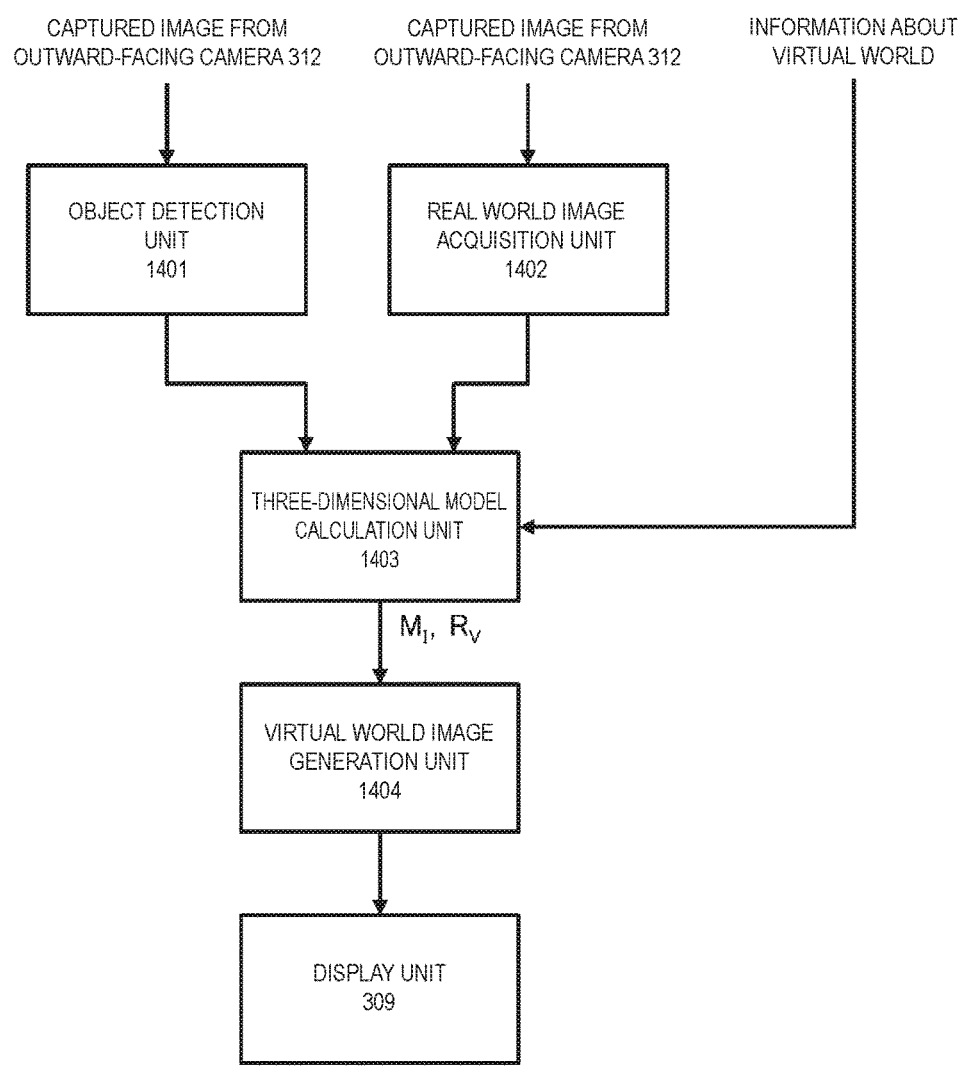
FIG. 14 is a diagram illustrating a functional configuration by which the head-mounted display 100 displays an image in which a three-dimensional model of an object existing in the real world is placed in the virtual world.

FIG. 14 illustrates a functional configuration by which the head-mounted display 100 displays an image in which an object existing in the real world has been converted to a three-dimensional model and placed in the virtual world.

An object detection unit 1401 detects a specific object in the real world, such as part of the user's body, on the basis of a recognition process on a captured image from the outward-facing camera 312, a detection signal from the distance sensor, or the like. In addition, all physical bodies in the real world within a fixed distance from the head-mounted display 100 may be detected as objects automatically.

A real world image acquisition unit 1402 acquires an image of the real world, including the object detected by the object detection unit 1401, on the basis of data such as an image captured with the outward-facing camera 312.

A three-dimensional model calculation unit 1403 generates a three-dimensional model $M_I$ of a certain range including the detected object, on the basis of the detection result by the object detection unit 1401 and the image of the real world acquired by the real world image acquisition unit 1402. In addition, the three-dimensional model calculation unit 1403 calculates the region $R_V$ of the virtual space V corresponding to the location where the object detection unit 1401 detected the object.

A virtual world image generation unit 1404 calculates a three-dimensional model $M_M$ in which the three-dimensional model $M_I$ of the object is placed in the corresponding region $R_V$ of the three-dimensional model V of the virtual world, and conducts a rendering process. Subsequently, the rendered image is displayed on the display unit 309.

Note that each of the above function blocks 1401 to 1404 is realized by a program executed by the control unit 301, for example, but may also be configured as dedicated hardware.

Figure 15:
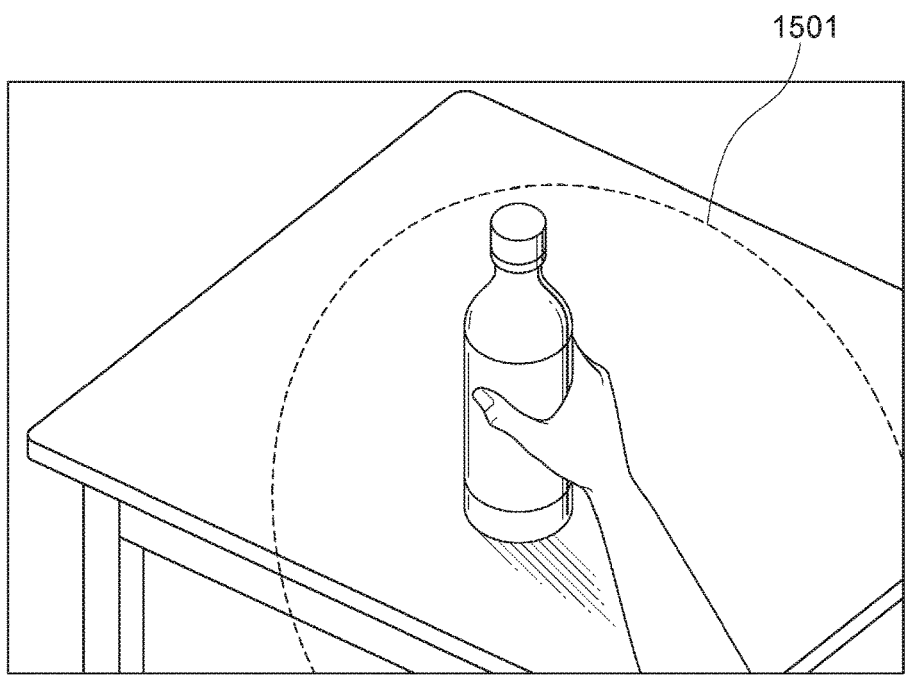
FIG. 15 is a diagram illustrating an example of how a specific object in the real world is detected.

FIG. 15 illustrates an example of how the object detection unit 1401 detects a specific object such as part of the user's body in the real world, as indicated by the reference number 1501. The outward-facing camera 312 captures an image of the real world including the object detected by the object detection unit 1401. In the example illustrated in FIG. 15, a PET bottle placed on a table and grasped by the user's right hand in the real world is detected by the object detection unit 1401.

Figure 16:
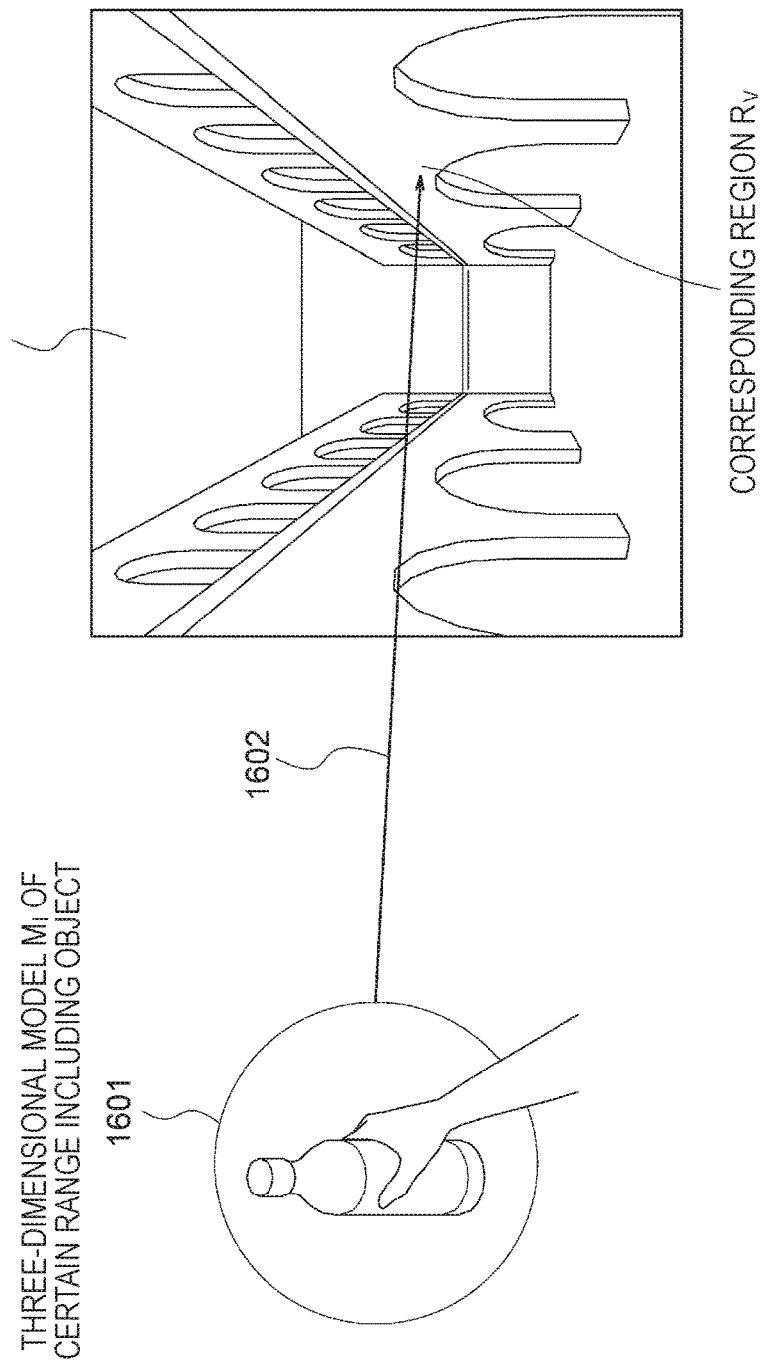
FIG. 16 is a diagram illustrating how a three-dimensional model $M_I$ of a designated range including a detected object is generated, and also how a corresponding region $R_V$ of a virtual space V is calculated.

FIG. 16 illustrates an example of how the three-dimensional model calculation unit 1403 generates a three-dimensional model $M_I$ of a certain range including the object detected by the object detection unit 1401, as indicated by the reference number 1601. In the illustrated example, an image $M_I$ is generated in which the user's right hand and the PET bottle grasped in the right hand have been converted into a three-dimensional model. FIG. 16 also illustrates an example of how the three-dimensional model calculation unit 1403 calculates the region $R_V$ of the virtual space V corresponding to the location where the object detection unit 1401 detected the object.

Figure 17:
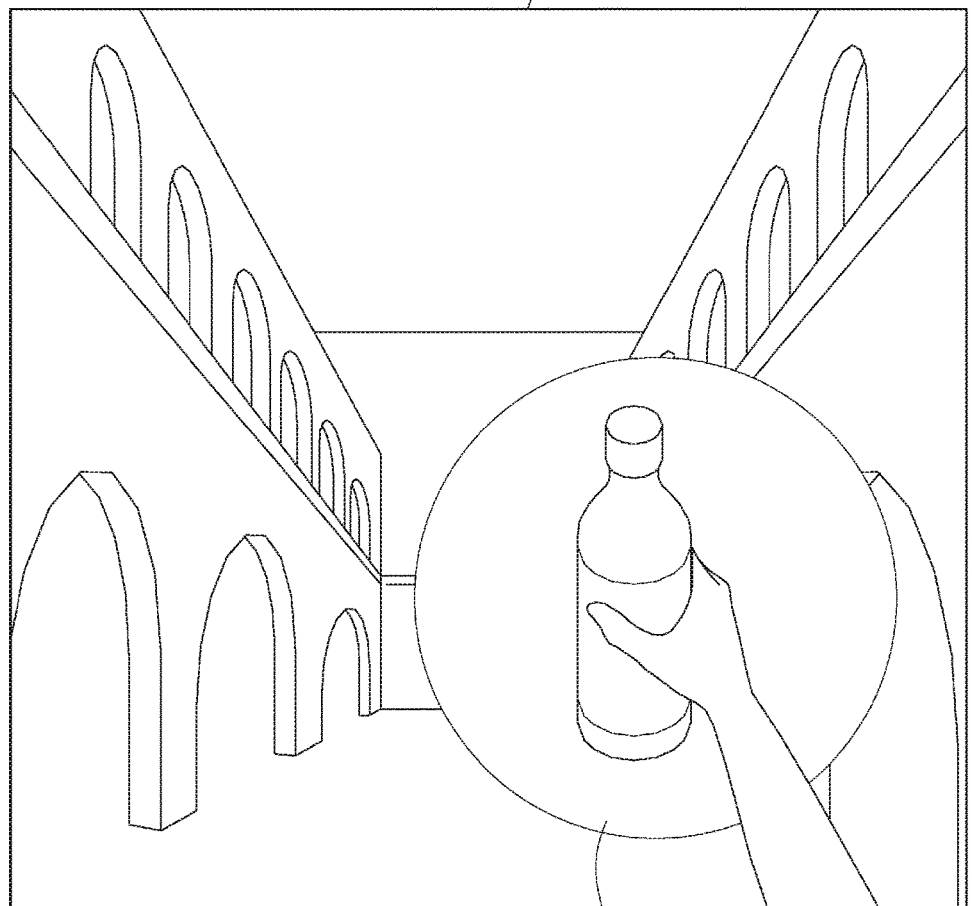
FIG. 17 is a diagram illustrating an example of the result of calculating and rendering a three-dimensional model $M_M$ in which a three-dimensional model $M_I$ of an object is placed in a corresponding region $R_V$ of a three-dimensional model V of the virtual world.

FIG. 17 illustrates an example of the result of the virtual world image generation unit 1404 calculating and rendering a three-dimensional model $M_M$ in which the three-dimensional model $M_I$ of the object is placed in the corresponding region $R_V$ of the three-dimensional model V of the virtual world. In the illustrated example, an image $M_I$ in which the user's right hand and the PET bottle grasped in the right hand have been converted into a three-dimensional model is superimposed onto a three-dimensional image of the virtual space V.

Note that in the examples illustrated in FIGS. 15 to 17, a virtual object does not exist in front of the corresponding region $R_V$ in the virtual space V corresponding to the three-dimensional model $M_I$ of the object, and thus the entire three-dimensional model $M_I$ is displayed as illustrated in FIG. 17. However, if a virtual object exists in front of the object in the real world (in the examples illustrated in FIGS. 15 to 17, the PET bottle), the three-dimensional model $M_I$ is displayed obscured behind by the virtual object.

Figure 18:
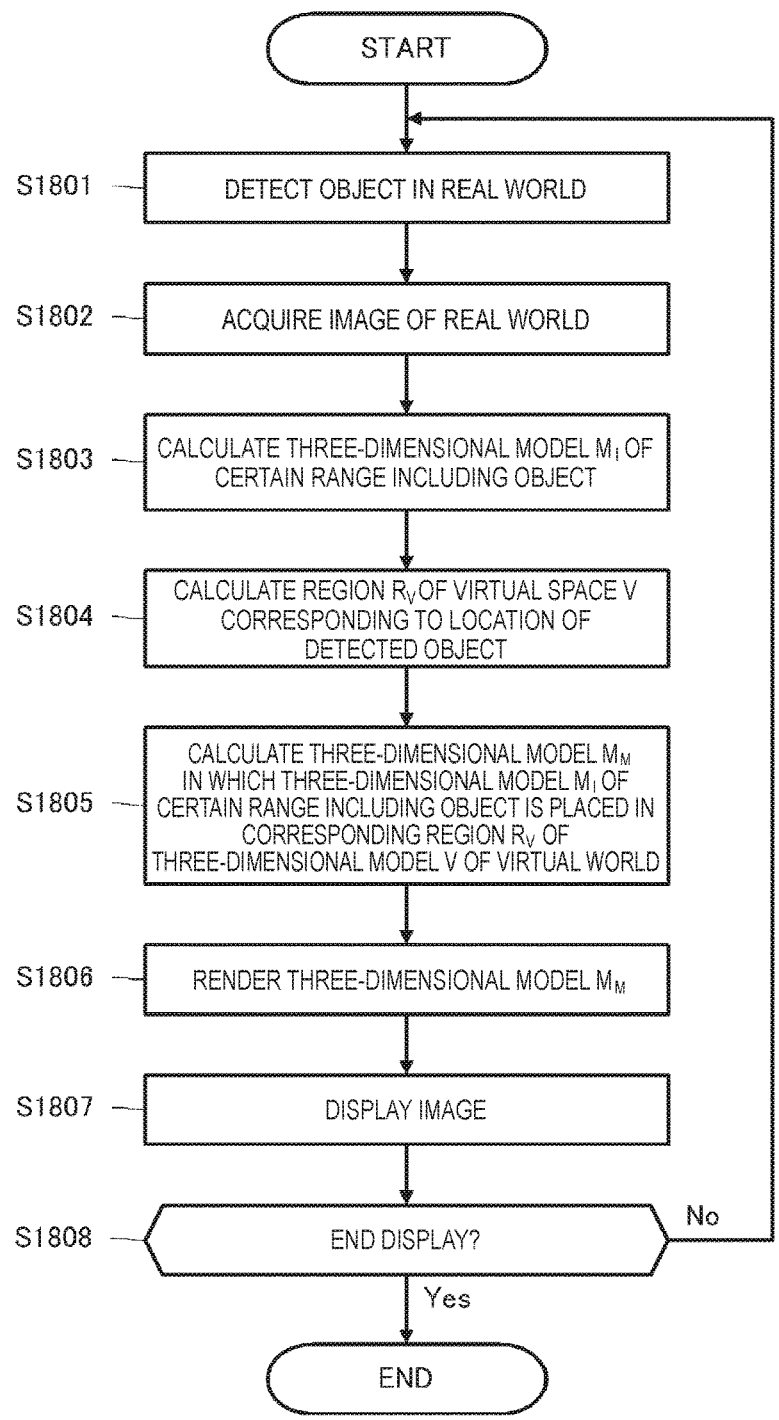
FIG. 18 is a flowchart illustrating a processing sequence by which the head-mounted display 100 displays an image in which a three-dimensional model of an object existing in the real world is placed in the virtual world.

FIG. 18 illustrates, in flowchart form, a processing sequence by which the head-mounted display 100 displays an image in which a three-dimensional model of an object existing in the real world is placed in the virtual world.

The object detection unit 1401 detects a specific object in the real world, such as part of the user's body, on the basis of a recognition process on a captured image from the outward-facing camera 312, a detection signal from the distance sensor, or the like (step S1801).

In step S1801, the object detection unit 1401 may also automatically detect all physical bodies in the real world within a fixed distance from the head-mounted display 100. For example, as the user brings his or her hand holding a physical body such as a cup close to the head-mounted display 100, the physical body is detected as an object automatically and tracked as long as the hand remains within a fixed distance. Also, if the hand moves away farther than the fixed distance, the object detection unit 1401 no longer detects the physical body, and stops tracking.

Also, in parallel with the object detection process by the object detection unit 1401, the real world image acquisition unit 1402 acquires an image of the real world, including the object detected by the object detection unit 1401, on the basis of data such as an image captured with the outward-facing camera 312 (step S1802).

Subsequently, the three-dimensional model calculation unit 1403 generates a three-dimensional model $M_I$ of a certain range including the detected object, on the basis of the detection result by the object detection unit 1401 and the image of the real world acquired by the real world image acquisition unit 1402 (step S1803).

In addition, the three-dimensional model calculation unit 1403 calculates the region $R_V$ of the virtual space V corresponding to the location where the object detection unit 1401 detected the object (step S1804).

Subsequently, the virtual world image generation unit 1404 calculates a three-dimensional model $M_M$ in which a three-dimensional model $M_I$ of a certain range including the object is placed in the corresponding region $R_V$ of the three-dimensional model V of the virtual world (step S1805), and conducts a process of rendering $M_M$ to also appear in 3D (step S1806). Subsequently, the rendered image is displayed on the display unit 309 (step S1807).

Additionally, when continuing to display the image of the virtual world with the display unit 309 (step S1808, No), the process discussed above is returned to step S1801 and repeatedly executed.

Note that during the period of displaying the three-dimensional model $M_I$ of the object in the real world, in step S1801, the corresponding region $R_V$ in which to place the three-dimensional model $M_I$ in the virtual space V is continually updated as the object in the real world moves. In addition, the boundary may be operated on the condition that the current position of the object overlaps with the boundary between the three-dimensional model $M_I$ of the real world and the virtual world V being displayed on the display unit 309. Alternatively, a state enabling the boundary to be operated may be activated by recognizing a specific gesture by the user.

As discussed above, according to the head-mounted display 100 in accordance with the second embodiment, the user becomes able to interact with the real world without diminishing the sense of immersion into the virtual world. For a user waring such a head-mounted display 100, psychological resistance against immersing oneself into the virtual world may be lessened. In addition, the user is able to reduce the risk of physical harm caused by body movements in the real world, even when immersed in the virtual world.

CITATION LIST

Patent Literature

Patent Literature 1: JP 2012-141461A
Patent Literature 2: JP 2012-42654A
Patent Literature 3: JP 2008-304268A
Patent Literature 4: JP 2013-258573A

INDUSTRIAL APPLICABILITY

The foregoing thus describes the technology disclosed in this specification in detail and with reference to specific embodiments. However, it is obvious that persons skilled in the art may make modifications and substitutions to these embodiments without departing from the spirit of the technology disclosed in this specification.

This specification primarily describes an embodiment applying the technology disclosed in this specification to an opaque head-mounted display, but the gist of the technology disclosed in this specification is not limited thereto. The technology disclosed in this specification may be applied similarly to various types of image display devices equipped with a function of displaying images of the real world and images of a virtual world, such as a see-through head-mounted display, a head-up display, a camera-equipped smartphone, and a multi-function terminal.

Essentially, the technology disclosed in this specification has been described by way of example, and the stated content of this specification should not be interpreted as being limiting. The spirit of the technology disclosed in this specification should be determined in consideration of the claims.

Additionally, the present technology disclosed herein may also be configured as below.

(1)

An image display device worn on a head or face, including:
a display unit;
a real world image acquisition unit configured to acquire an image of a real world;
a region specification unit configured to specify a region in which to display the image of the real world; and
an image generation unit configured to mix the image of the real world into a virtual image on a basis of the specified region, and generate an image to display on the display unit.

(2)

The image display device according to (1), wherein
the display unit is disposed at an eye position of a user wearing the image display device on his or her head or face,
the image display device further includes an image capture unit that captures an image of a gaze direction of the user, and
the real world image acquisition unit acquires an image of the real world captured by the image capture unit.

(3)

The image display device according to any of (1) or (2), further including:
a virtual world image generation unit configured to generate an image of a virtual world; and
a region image generation unit configured to calculate an image $R_I$ of the real world and an image $R_V$ of the virtual world corresponding to the region specified by the region specification unit, wherein
the image generation unit generates the image to display on the display unit by replacing the image $R_V$ of a corresponding region of a virtual world rendering result V with the image $R_I$ of the corresponding region of the real world.

(4)

The image display device according to (3), wherein
the region specification unit specifies the region in which to display the image of the real world based on an operation by the user.

(5)

The image display device according to (4), wherein
the image generation unit controls a mixture ratio of the image of the real world based on an elapsed time from when the user performed the operation to specify the region.

(6)

The image display device according to (5), wherein
after a fixed time elapses from when the user performed the operation to specify the region, the image generation unit switches the corresponding region from the image $R_I$ of the real world to the image $R_V$ of the virtual world, or alternatively, gradually reverts the corresponding region back to the image $R_V$ of the virtual world.

(7)

The image display device according to any of (4) to (6), further including:
an input unit configured to accept an input operation by the user, wherein the region specification unit specifies the region in which to display the image of the real world based on an operation by the user with respect to the input unit.

(8)

The image display device according to (7), wherein the input unit is a touch panel, and the region specification unit specifies a region corresponding to a location where the user touched the touch panel.

(9)

The image display device according to (8), wherein the touch panel is disposed behind a display screen of the display unit.

(10)

The image display device according to any of (4) to (6), wherein the region specification unit specifies the region in which to display the image of the real world based on a gesture operation by the user.

(11)

The image display device according to any of (4) to (6), wherein the region specification unit changes the region in which to display the image of the real world according to an operation by the user on a boundary between the image of the real world and the image of the virtual world.

(12)

The image display device according to any of (1) or (2), further including:

an object detection unit configured to detect an object in the real world; and a three-dimensional model calculation unit configured to generate a three-dimensional model $M_I$ of a certain range including the object on a basis of the image of the real world acquired by the real world image acquisition unit, and also calculate a region $R_V$ of a virtual space V corresponding to a location where the object was detected, wherein the image generation unit calculates a three-dimensional model $M_M$ in which the three-dimensional model $M_I$ of the object is placed in the corresponding region $R_V$ of a three-dimensional model V of the virtual world, and conducts a rendering process.

(13)

The image display device according to (12), wherein the object detection unit detects a part of the user's body, or alternatively, a predetermined physical body in the real world.

(14)

The image display device according to (12), wherein the object detection unit detects a physical body in the real world within a fixed distance from the image display device.

(15)

The image display device according to any of (12) to (14), wherein the image generation unit controls a mixture ratio of the image of the real world based on an elapsed time from when the object detection unit detected the object.

(16)

The image display device according to any of (12) to (15), wherein the region specification unit operates a boundary on a condition that a current position of the object overlaps with a boundary between the three-dimensional model $M_I$ of the real world and the virtual world V.

(17)

An image display method including:

a real world image acquisition step of acquiring an image of a real world;

a region specification step of specifying a region in which to display the image of the real world;

an image generation step of mixing the image of the real world into a virtual image on a basis of the specified region, and generating an image; and a display step of displaying the generated image on a display unit disposed at an eye position of a user.

(18)

An image display method including:

a real world image acquisition step of acquiring an image of a real world;

a region specification step of specifying a region in which to display the image of the real world;

a virtual world image generation step of generating an image of a virtual world;

a region image generation step of calculating an image $R_I$ of the real world and an image $R_V$ of the virtual world corresponding to the region specified in the region specification step;

an image generation step of generating an image by replacing the image $R_V$ of a corresponding region of a virtual world rendering result V with the image $R_I$ of the corresponding region of the real world; and a display step of displaying the generated image on a display unit disposed at an eye position of a user.

(19)

An image display method including:

a real world image acquisition step of acquiring an image of a real world;

an object detection step of detecting an object in the real world; and a region specification step of specifying a corresponding region $R_V$ of a three-dimensional model V of the virtual world of the detected object;

a three-dimensional model calculation step of generating a three-dimensional model $M_I$ of a certain range including the object on a basis of the image of the real world acquired by the real world image acquisition unit, and also calculating the region $R_V$ of a virtual space V corresponding to a location where the object was detected;

an image generation step of calculating a three-dimensional model $M_M$ in which the three-dimensional model $M_I$ of the object is placed in the corresponding region $R_V$ of the three-dimensional model V of the virtual world, and conducting a rendering process to thereby generate an image; and a display step of displaying the generated image on a display unit disposed at an eye position of a user.

REFERENCE SIGNS LIST 100 head-mounted display
101L, 101R virtual image optical unit
103L, 103R microphone
104L, 104R display panel
105 interpupillary width adjustment mechanism
301 control unit
301A ROM
301B RAM
302 input interface unit
303 remote control receiving unit
304 status information acquisition unit
305 communication unit
306 storage unit
307 image processing unit
308 display driving unit
309 display unit 310 virtual image optical unit
312 outward-facing camera
313 audio processing unit
314 audio input/output unit
315 touch panel
316 environment information acquisition unit
701 virtual world image generation unit
702 real world image acquisition unit
703 region specification unit
704 region image generation unit
705 image replacement unit
1401 object detection unit
1402 real world image acquisition unit
1403 three-dimensional model calculation unit
1404 virtual world image generation unit

The invention claimed is:

1. An image display device worn on a head or face, comprising:
a display configured to be disposed at an eye position of a user wearing the image display device on his or her head or face;
a processing device configured to control:
acquiring an image of a real world;
specifying a region in which to display the image of the real world;
mixing the image of the real world into a virtual image on a basis of the region specified; and
generating an image to display on the display by mixing the image of the real world, in which the image of the real world corresponds to the region specified, into the virtual image,
wherein the image of the real world is positioned in an area of the virtual image corresponding to the region specified.

2. The image display device according to claim 1, wherein the processing device is configured to control:
capturing an image of a gaze direction of the user, and acquiring a captured image of the real world.

3. The image display device according to claim 1, wherein the processing device is configured to control:
generating an image of a virtual world;
calculating an image $R_I$ of the real world and an image $R_V$ of the virtual world corresponding to the region specified, and
generating the image to display on the display by replacing the image $R_V$ of a corresponding region of a virtual world rendering result V with the image $R_I$ of the corresponding region of the real world.

4. The image display device according to claim 3, wherein the processing device is configured to control specifying the region in which to display the image of the real world based on an operation by the user.

5. The image display device according to claim 4, wherein the processing device is configured to control specifying the region in which to display the image of the real world based on a gesture operation by the user.

6. The image display device according to claim 4, wherein the processing device is configured to control:
accepting an input operation by the user, and
specifying the region in which to display the image of the real world based on an operation by the user with respect to an input device.

7. The image display device according to claim 6, wherein the input device is a touch panel, and
the processing device is configured to control specifying a region corresponding to a location where the user touched the touch panel.

8. The image display device according to claim 7, wherein the touch panel is disposed behind a display screen of the display.

9. The image display device according to claim 1, wherein the processing device is configured to control:
detecting an object in the real world; and
generating a three-dimensional model $M_I$ of a certain range including the object on a basis of the image of the real world acquired, and also calculating a region $R_V$ of a virtual space V corresponding to a location where the object was detected; and
calculating a three-dimensional model $M_M$ in which the three-dimensional model $M_I$ of the object is placed in the corresponding region $R_V$ of a three-dimensional model V of the virtual world, and conducting a rendering process.

10. The image display device according to claim 9, wherein the processing device is configured to control detecting a part of the user's body, or alternatively, a predetermined physical body in the real world.

11. The image display device according to claim 9, wherein the processing device is configured to control detecting a physical body in the real world within a fixed distance from the image display device.

12. The image display device according to claim 9, wherein the processing device is configured to control operating a boundary on a condition that a current position of the object overlaps with a boundary between the three-dimensional model $M_I$ of the real world and the virtual world V.

13. The image display device of claim 1,
wherein the processing device is configured to control:
detecting an object in the real world;
generating a three-dimensional model $M_I$ of a certain range including the object on a basis of the image of the real world acquired; and
when a virtual object is determined to exist in the virtual image at a location in the virtual image corresponding to a location in front of the object in the real world, generating the image to display on the display the three-dimensional model $M_I$ of the object displayed obscured behind the virtual object in the virtual image.

14. An image display device worn on a head or face, comprising:
a display;
a processing device configured to control:
acquiring an image of a real world;
specifying a region in which to display the image of the real world;
mixing the image of the real world into a virtual image on a basis of the specified region, and generating an image to display on the display;
generating an image of a virtual world;
calculating an image $R_I$ of the real world and an image $R_V$ of the virtual world corresponding to the region specified; and
generating the image to display on the display by superimposing, onto the image $R_V$ of a corresponding region of a virtual world rendering result V, the image $R_I$ of the corresponding region of the real world,
wherein the processing device is configured to control:
specifying the region in which to display the image of the real world based on an operation by the user, and a mixture ratio of the image of the real world based on an elapsed time from when the user performed the operation to specify the region.

15. The image display device according to claim 14, wherein
after a fixed time elapses from when the user performed the operation to specify the region, the processing device is configured to control switching the corresponding region from the image $R_I$ of the real world to the image $R_V$ of the virtual world, or alternatively, gradually reverting the corresponding region back to the image $R_V$ of the virtual world.

16. An image display device worn on a head or face, comprising:
a display;
a processing device configured to:
acquiring an image of a real world;
specifying a region in which to display the image of the real world;
mixing the image of the real world into a virtual image on a basis of the specified region, and generating an image to display on the display;
generating an image of a virtual world;
calculating an image $R_I$ of the real world and an image $R_V$ of the virtual world corresponding to the region specified; and
generating the image to display on the display by superimposing, onto the image $R_V$ of a corresponding region of a virtual world rendering result V, the image $R_I$ of the corresponding region of the real world,
wherein the processing device is configured to control:
specifying the region in which to display the image of the real world based on an operation by the user, and
changing the region in which to display the image of the real world according to an operation by the user on a boundary between the image of the real world and the image of the virtual world.

17. An image display device worn on a head or face, comprising:
a display;
a processing device configured to control:
acquiring an image of a real world;
specifying a region in which to display the image of the real world;
mixing the image of the real world into a virtual image on a basis of the specified region, and generating an image to display on the display;
detecting an object in the real world;
generating a three-dimensional model $M_I$ of a certain range including the object on a basis of the image of the real world acquired, and calculating a region $R_V$ of a virtual space V corresponding to a location where the object was detected;
calculating a three-dimensional model $M_M$ in which the three-dimensional model $M_I$ of the object is placed in the corresponding region $R_V$ of a three-dimensional model V of the virtual world, and conducting a rendering process; and
a mixture ratio of the image of the real world based on an elapsed time from when the object is detected.

18. An image display method comprising:
controlling, by a processing device,
acquiring an image of a real world;
specifying a region in which to display the image of the real world;
mixing the image of the real world into a virtual image on a basis of the region specified;
generating an image based on the mixing the image of the real world, in which the image of the real world corresponds to the region specified, into the virtual image,
wherein the image of the real world is positioned in an area of the virtual image corresponding to the region specified; and
displaying the generated image on a display disposed at an eye position of theft user.

19. An image display method comprising:
controlling, by a processing device,
acquiring an image of a real world;
specifying a region in which to display the image of the real world;
generating an image of a virtual world;
calculating an image $R_I$ of the real world and an image $R_V$ of the virtual world, each of the image $R_I$ and the image $R_V$ corresponding to the region specified;
generating an image by superimposing, onto the image $R_V$ of a corresponding region of a virtual world rendering result V, the image $R_I$ of the corresponding region of the real world, wherein the image $R_I$ of the real world is positioned in an area of the virtual world rendering result V corresponding to the region specified; and
displaying the generated image on a display disposed at an eye position of the user.

20. An image display method comprising:
controlling, by a processing device,
acquiring an image of a real world;
detecting an object in the real world; and
specifying a corresponding region $R_V$ of a three-dimensional model V of the virtual world of the detected object;
generating a three-dimensional model $M_I$ of a certain range including the object on a basis of the image of the real world, and also calculating the region $R_V$ of a virtual space V corresponding to a location where the object was detected;
calculating a three-dimensional model $M_M$;
placing the three-dimensional model $M_I$ of the object in the corresponding region $R_V$ of the three-dimensional model V of the virtual world;
conducting a rendering process to thereby generate an image based on the placing the three-dimensional model $M_I$ of the object in the corresponding region $R_V$ of the three-dimensional model V of the virtual world, wherein the three-dimensional model $M_I$ of the object is positioned in an area of the virtual world corresponding to the corresponding region $R_V$ specified; and
displaying the generated image on a display disposed at an eye position of the user.

* * * * *